United States Patent
Seo et al.

(10) Patent No.: US 7,991,773 B2
(45) Date of Patent: Aug. 2, 2011

(54) METHOD OF CREATING PLAYBACK CONTROL FILE FOR RECORDING MEDIUM AND METHOD APPARATUS FOR REPRODUCING DATA USING THE PLAYBACK CONTROL FILE

(75) Inventors: Kang Soo Seo, Anyang-si (KR); Byung Jin Kim, Seongnam-si (KR); Jea Yong Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 1060 days.

(21) Appl. No.: 10/989,396

(22) Filed: Nov. 17, 2004

(65) Prior Publication Data

US 2005/0117461 A1 Jun. 2, 2005

(30) Foreign Application Priority Data

Nov. 18, 2003 (KR) .................. 10-2003-0081483

(51) Int. Cl.
*G06F 17/30* (2006.01)
(52) U.S. Cl. ............... 707/736; 352/1; 386/95; 386/125
(58) Field of Classification Search .................. None
See application file for complete search history.

(56) References Cited

U.S. PATENT DOCUMENTS

| | | | | |
|---|---|---|---|---|
| 5,481,519 A | * | 1/1996 | Hosoya | 369/53.21 |
| 5,953,513 A | * | 9/1999 | Saiki et al. | 710/62 |
| 6,243,328 B1 | * | 6/2001 | Fenner et al. | 707/104.1 |
| 2002/0135607 A1 | * | 9/2002 | Kato et al. | 345/716 |
| 2002/0145702 A1 | * | 10/2002 | Kato et al. | 352/1 |
| 2003/0133375 A1 | | 7/2003 | Yoshioka | |
| 2003/0161616 A1 | * | 8/2003 | Um et al. | 386/121 |
| 2004/0081434 A1 | * | 4/2004 | Jung et al. | 386/95 |
| 2004/0175159 A1 | * | 9/2004 | Oetzel et al. | 386/125 |
| 2005/0105894 A1 | * | 5/2005 | Jung et al. | 386/96 |
| 2005/0185927 A1 | * | 8/2005 | Kudou | 386/95 |

FOREIGN PATENT DOCUMENTS

| | | |
|---|---|---|
| KR | 1020020057441 | 7/2002 |
| WO | WO 03/034190 | 4/2003 |
| WO | WO 2005/050527 | 6/2005 |

OTHER PUBLICATIONS

Office Action for Chinese patent application No. 200480032784.0 dated Apr. 23, 2010.
Office Action for Malaysian application dated Mar. 18, 2008.
International Search Report dated Jun. 9, 2005.

* cited by examiner

*Primary Examiner* — Charles Rones
*Assistant Examiner* — Yuk Ting Choi
(74) *Attorney, Agent, or Firm* — Harness, Dickey & Pierce, P.L.C.

(57) ABSTRACT

A method of creating a playback control file for a recording medium and a method and apparatus for reproducing data using the playback control file are disclosed. The method of creating a playback control file includes reading an original PlayList from the recording medium, the original PlayList being configured to reproduce original data recorded on the recording medium, downloading at least one additional PlayList from an external source, the at least one PlayList being configured to reproduce additional data downloadable from the external source, and creating a composite PlayList by combining the original PlayList with the at least one additional PlayList, the composite PlayList being able to control reproduction of the original and additional data, individually or in combination. The method may further include playing-back any one of the original PlayList, the at least one additional PlayList, and the composite PlayList.

6 Claims, 23 Drawing Sheets

```
PID_Table () {
    length
    number_of_PID_entries
    for (k=0: k< number_of_PID_entries: k++) {
        ref_to_stream_PID(k)
        attributes
        sub_PlayItem_num
    }
}
```

METHOD OF CREATING PLAYBACK CONTROL FILE FOR RECORDING MEDIUM AND METHOD APPARATUS FOR REPRODUCING DATA USING THE PLAYBACK CONTROL FILE

This application claims the benefit of the Korean Patent Application No. 10-2003-0081483, filed on Nov. 18, 2003, which is hereby incorporated by reference as if fully set forth herein.

BACKGROUND OF THE INVENTION

1. Field of the Invention

The present invention relates to a recording medium, and more particularly, to a method of creating a playback control file for a recording medium and method and apparatus for reproducing data using the playback control file. Although the present invention is suitable for a wide scope of applications, it is particularly suitable for creating a playback control file that enables data being recorded on the recording medium and data downloaded from an external source to be put to combined use, and for playing-back the playback control file.

2. Discussion of the Related Art

Optical discs are widely used as a recording medium for recording mass data. Presently, among a wide range of optical discs, a new high density optical recording medium, such as a blu-ray disc (hereinafter referred to as "BD"), is under development for recording (or writing) and storing high definition video and audio data for a long period of time. Currently, the blu-ray disc (BD), which is known to be the next generation recording medium technology, is under development as a next generation optical recording solution that is capable of having data significantly surpassing the conventional DVD, along with many other digital apparatuses.

Most particularly, in the above-described optical recording and/or reproducing apparatus, the basic function(s) of recording and/or reproducing the blu-ray disc (BD), as well as additional functions taking into account a combined usage with related peripheral digital apparatuses are/is being considered. Thus, generally, the optical recording and/or reproducing apparatus must be provided with functions of either receiving external input signals and displaying the received signals, or applying external input signals with a built-in blu-ray disc (BD) playback signal for reproduction.

However, since preferable playback (or reproducing) methods for reproducing a combination of the external input signal and the built-in blu-ray disc (BD) playback signal are not yet known and familiarized, there are many restrictions in the full-scale development of a blu-ray disc (BD)-based optical recording and/or reproducing apparatus. And, such restrictions cause problems in the field of reproducing the external input signal and the built-in blu-ray disc (BD) playback signal as one single reproducing unit.

SUMMARY OF THE INVENTION

Accordingly, the present invention is directed to a method of creating a playback control file for a recording medium and method and apparatus for reproducing data using the playback control file that substantially obviate one or more problems due to limitations and disadvantages of the related art.

An object of the present invention is to provide a method and apparatus for reproducing data using the playback control file that are suitable for a recording medium, such as a blu-ray disc (BD).

Another object of the present invention is to provide a method for control and playing-back a Composite PlayList file of a high density optical disc, wherein a signal recorded in a blu-ray disc (BD) and a signal downloadable from an external source are combined for reproduction (or playback), as standardized information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of creating a playback control file for a recording medium includes reading an original PlayList from the recording medium, the original PlayList being configured to reproduce original data recorded on the recording medium, downloading at least one additional PlayList from an external source, the at least one PlayList being configured to reproduce additional data downloadable from the external source, and creating a composite PlayList by combining the original PlayList with the at least one additional PlayList, the composite PlayList being able to control reproduction of the original and additional data, individually or in combination. The method may further include playing-back any one of the original PlayList, the at least one additional PlayList, and the composite PlayList.

The method of creating a playback control file may include any one of the following examples. The original PlayList may include a PlayItem required for reproducing the original data, and each additional PlayList may include at least one SubPlayItem required for reproducing the additional data. Alternatively, the original PlayList may include a PlayItem required for reproducing the original data, and each additional PlayList may include a SubPlayItem required for reproducing the additional data. Or, the original PlayList may include a first PlayItem required for reproducing the original data, and each additional PlayList may include a second PlayItem and at least one SubPlayItem required for reproducing the additional data, wherein the second PlayItem is identical with the first PlayItem. Furthermore, the original PlayList may include a first PlayItem required for reproducing the original data, and each additional PlayList may include a second PlayItem and a SubPlayItem required for reproducing the additional data, wherein the second PlayItem is identical with the first Playitem. And, finally, the original PlayList may include a first PlayItem required for reproducing the original data, and each additional PlayList may include a second PlayItem required for reproducing the additional data.

In another aspect of the present invention, an apparatus for reproducing data of a recording medium includes a data storage configured to store additional data and at least one additional PlayList downloaded from an external source, the at least one PlayList being configured to reproduce the additional data, and a controller configured to read an original PlayList from the recording medium, the original PlayList being configured to reproduce original data recorded on the recording medium, wherein the controller generates a composite PlayList by combining the original PlayList and the at least one additional PlayList so as to control reproduction of the original and additional data, individually or in combination.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium.

Figure 1:
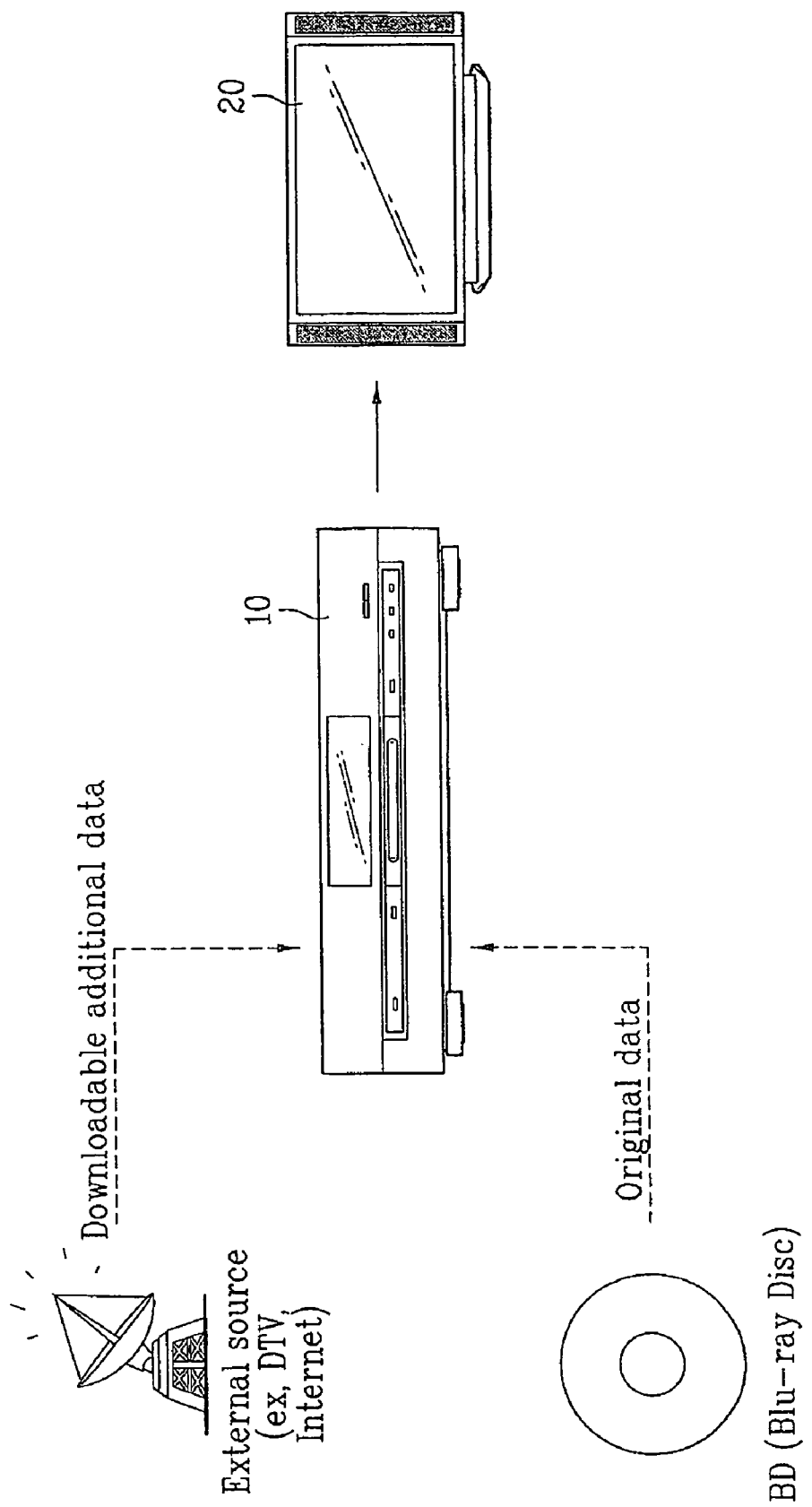
FIG. 1 illustrates a general view of the present invention.

FIG. 1 illustrates a general view of the present invention, which shows an example of a combined usage between an optical recording and/or reproducing apparatus 10 and peripheral apparatuses. The optical recording and/or reproducing apparatus 10 according to the present invention is an apparatus for recording and/or reproducing optical disc of various standards (or sizes). The optical recording and/or reproducing apparatus 10 may be designed to record and/or reproduce optical disc of a specific standard (e.g., a blu-ray disc (BD)). Alternatively, the apparatus may also be designed to only have a reproducing function and no recording function. However, considering the completion of the blu-ray disc (BD) standard and its connection with the peripheral apparatuses, either a BD-Player reproducing the blu-ray disc (BD) or a BD-Recorder recording and/or reproducing the blu-ray disc (BD) will be used as an example in the description of the present invention.

Apart from the function of recording and/or reproducing the disc, the optical recording and/or reproducing apparatus is also provided with a function of receiving an external input signal, processing the received signal, and transmitting the processed signal to a user through another external display 20. In this case, there are no limitations in the external signals that can be inputted, however, digital television (DTV) broadcast programs and the Internet are the most typical types of external signals. Most particularly, since the Internet is presently a medium that can be easily accessed by the public, users can make use of specific data provided on the Internet by downloading such data through the optical recording and/or reproducing apparatus.

Moreover, in the present invention, when original data is recorded on the optical disc (BD), which is loaded in the optical recording and/or reproducing apparatus 10, and additional data related to the original data is downloadable from an external source, the original data and the additional data are combined and reproduced. More specifically, for example, when a video stream and an audio stream (both in Korean) for a film dubbed in Korean are recorded as the original data on the optical disc, and when an audio stream (in English) for the original film in English exists on the Internet as the additional data, a user may, if desired, download the audio stream (in English), which is the additional data existing on the Internet and reproduce the downloaded audio stream (in English) along with the video stream within the original data. In order to meet with the demands of the user, a definition of the relation between the original data and the additional data is necessary, and a systematic method for controlling and reproducing such data as desired by the user is also required.

As aforementioned, the signal recorded within the disc is referred to as the original data and the signal existing in the external source is referred to as the additional data, for simplicity. However, such terms may vary depending upon the method of acquiring the data and are not limited to any specific type of data. Therefore, the additional data generally includes audio data, presentation graphic data, subtitle data, interactive graphic data, and so on. And, without being limited to the above-mentioned examples, it is possible to propose a combination of the original data and the additional data, wherein an audio stream (in English) is the original data and a video stream is the additional data.

In order to meet with the demands of the user, the original data and the additional data must be provided with a correlated (or co-linked) file structure (substantially an identical file structure), which will be described in detail with reference to FIGS. 2 and 3. Herein, FIGS. 2 and 3 illustrate a file structure and a data recording structure being recorded on an optical disc according to the present invention, respectively.

Figure 2:
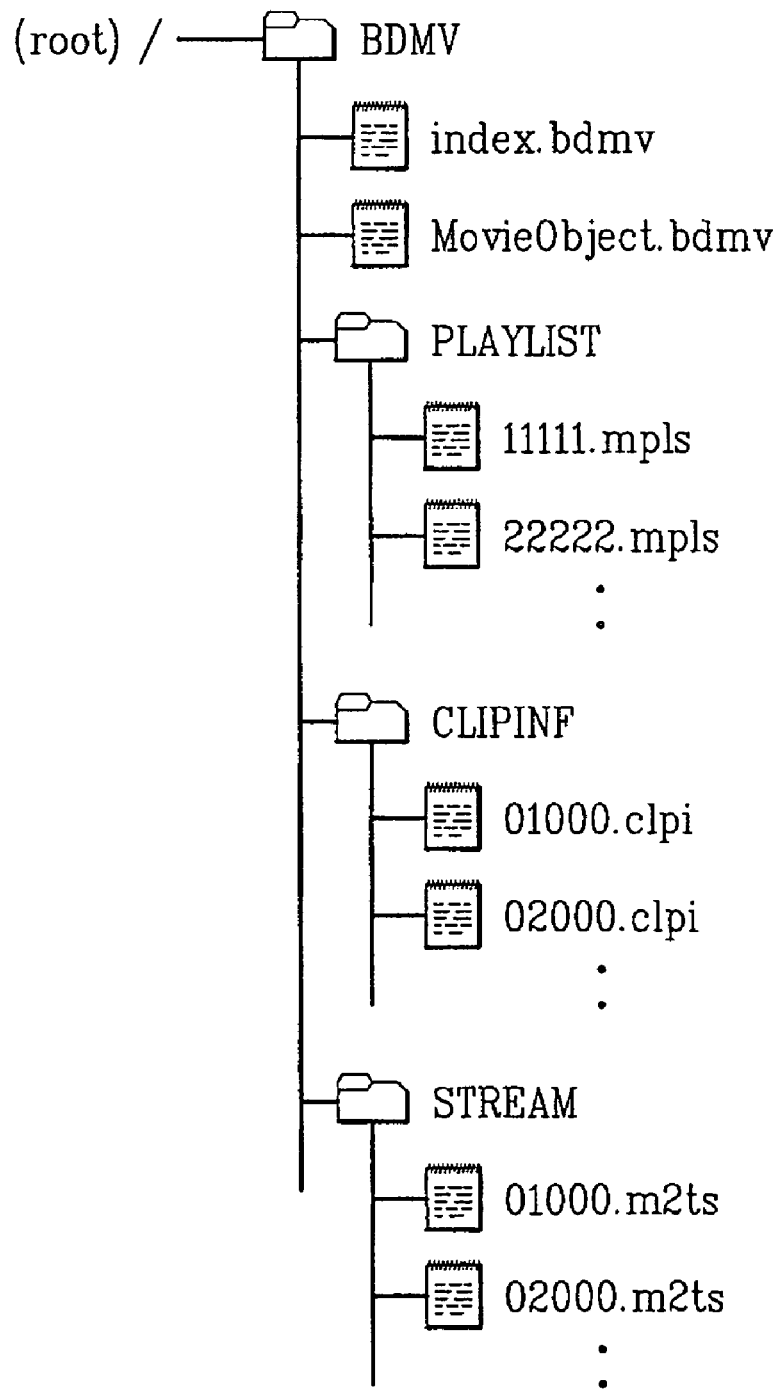
FIG. 2 illustrates a file structure being recorded on an optical disc, the optical disc being a recording medium, according to the present invention.
Figure 3:
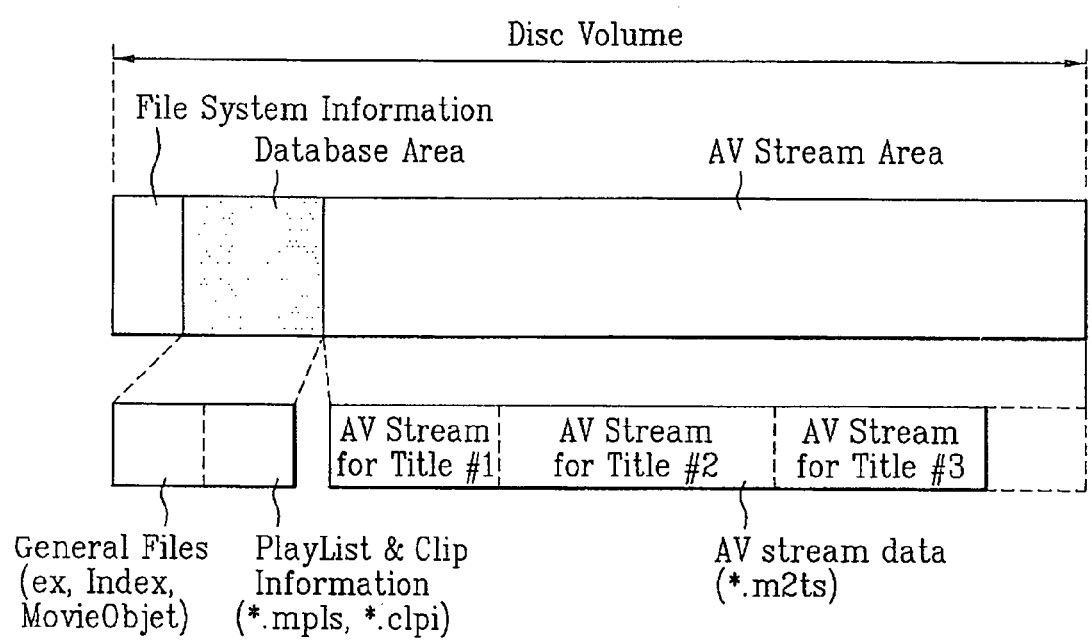
FIG. 3 illustrates a data recording structure being recorded on the optical disc, the optical disc being the recording medium, according to the present invention.

Referring to FIG. 2, which illustrates a file structure for controlling information recorded within the disc, at least one BD directory (BDMV) is included in a root directory (root). Each BD directory includes an "index.bdmv" and a "MovieObject.bdmv", which represent general files that are used when interacting with one or more users. For example, the index file contains data representing an index table which includes various information regarding a plurality of selectable menus and titles.

Each BD directory includes three file directories including data to be reproduced, and information required for reproducing the data. The file directories included in each BD directory are a stream directory (STREAM), a playlist directory (PLAYLIST), and a clip information directory (CLIPINF). The stream directory includes audio/video (AV) stream (hereinafter referred to as "AV stream") files. More specifically, the AV streams (01000.m2ts, 02000.m2ts) may generally be in the form of MPEG2 transport packets and be named as "*.m2ts". Further, the clip information directory (CLIPINF) includes clip information files (01000.clpi, 02000.clpi) being in one-to-one correspondence with the AV stream files (clip files) included in the stream directory. A clip information file (*.clpi) includes property information and timing information of a corresponding AV stream (clip file), wherein the timing information includes mapping information that maps presentation time stamp (PTS) with source packet number (SPN) using entry point map.

In the BD standard, each pair of an AV stream (*.m2ts) and its corresponding clip information file (*.clpi), which are in one-to-one correspondence with one another, is designated as a clip. For example, 01000.clpi included in CLIPINF includes the property and timing information of 01000.m2ts included in STREAM, and 01000.clpi and 01000.m2ts form a clip. Hereinafter, the clip corresponding to the original data, which is recorded within the disc, will be referred to as an "original clip", and the clip corresponding to the additional data, which is downloadable from an external source (i.e., outside of the disc), will be referred to as an "additional clip".

Referring back to FIG. 2, the playlist directory (PLAYLIST) includes one or more PlayList files (*.mpls), wherein each PlayList file (*.mpls) includes at least one PlayItem which designates playing interval for a specific original clip. More specifically, a PlayItem includes information designating beginning and ending times (In-Time and Out-Time) for reproduction of a specific original clip, which may be designated by clip_Information_File_name within the PlayItem. Accordingly, a PlayList file (*.mpls) represents a basic playback control file for playing-back a desired clip from a combination of one or more PlayItems. Therefore, by providing a PlayItem appropriate for a corresponding playback purpose within the PlayList file (*.mpls), special playback functions, such as trickplay, skipplay, slideshow, and so on, can also be executed.

FIG. 3 illustrates a general view of the structure of the information related with the file structure being recorded on the disc. Starting from the inner circumference (or center) of the disc, the disc volume includes a file system information area occupying the inmost portion of the disc volume, an AV stream area occupying the outmost portion of the disc volume, and a database area occupied between the file system information area and the stream data area. In the file system information area, system information for controlling the entire data files is recorded. And, original data such as audio/video/graphic data are recorded in the AV stream area. The general files, PlayList files, and clip information files are recorded in the database area of the disc volume. Most particularly, as described above, the data recorded in the AV stream area within the disc is referred to as the original data. Therefore, by using the information within the database area, a user is able to select an AV stream the user desires to reproduce and decide and use the appropriate reproducing method of the selected AV stream.

The present invention is related to a method for reproducing the file structure and the original data recorded on the optical disc along with the additional data downloadable from the external source, as shown in FIGS. 2 and 3. A method of creating and controlling a playback control file, which can combine and reproduce the original data and the additional data, according to a plurality of preferred embodiments will now be described in detail. Accordingly, the above-described playback control file within the disc refers to the PlayList file (*.mpls) and the clip information file (*.clpi). However, the clip information file (*.clpi), along with the stream file (*.m2ts), is provided either to the original clip or to the additional clip. Accordingly, in order to combine and playback the original clip and the additional clip as one single playback unit, an independent PlayList file (*.mpls) is required. Hereinafter, the playback control file will be described with reference to the PlayList file (*.mpls) as the example.

As the playback control file, a PlayList for controlling the original data will be referred to as an original PlayList, and a PlayList for controlling the additional data will be referred to as an additional PlayList, for simplicity. Furthermore, a PlayList combining the original PlayList and the additional PlayList so as to reproduce both the original data and the additional data will be referred to as a Composite PlayList.

Figure 4A:
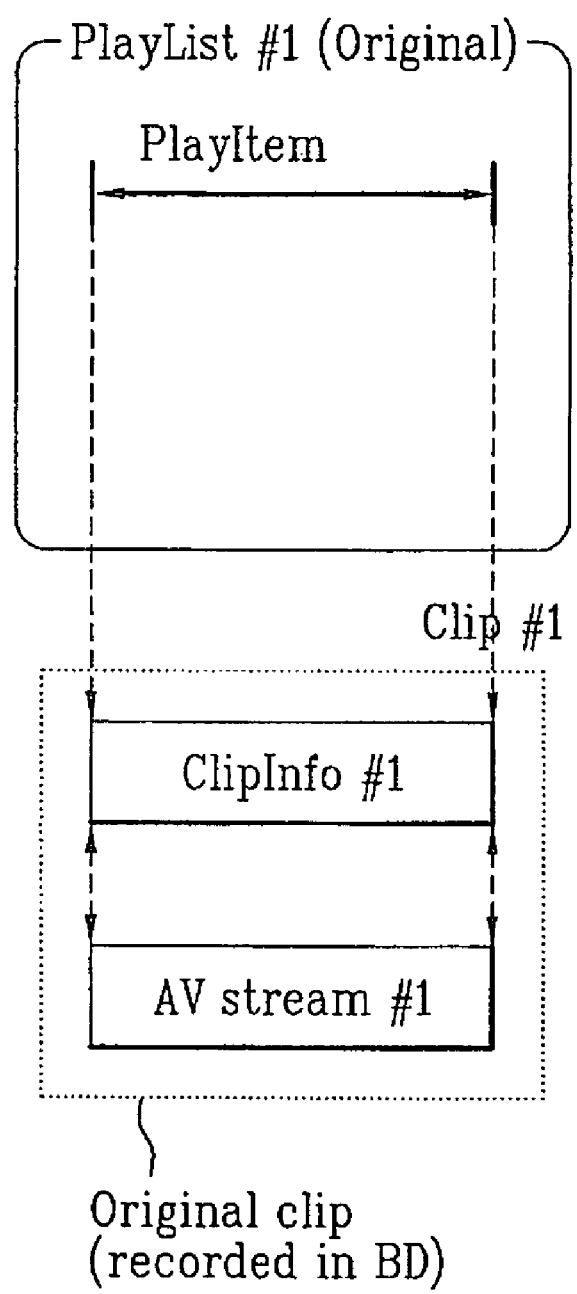
FIGS. 4A to 4C illustrate a method for playing-back a Composite PlayList according to a first embodiment of the present invention.
Figure 4B:
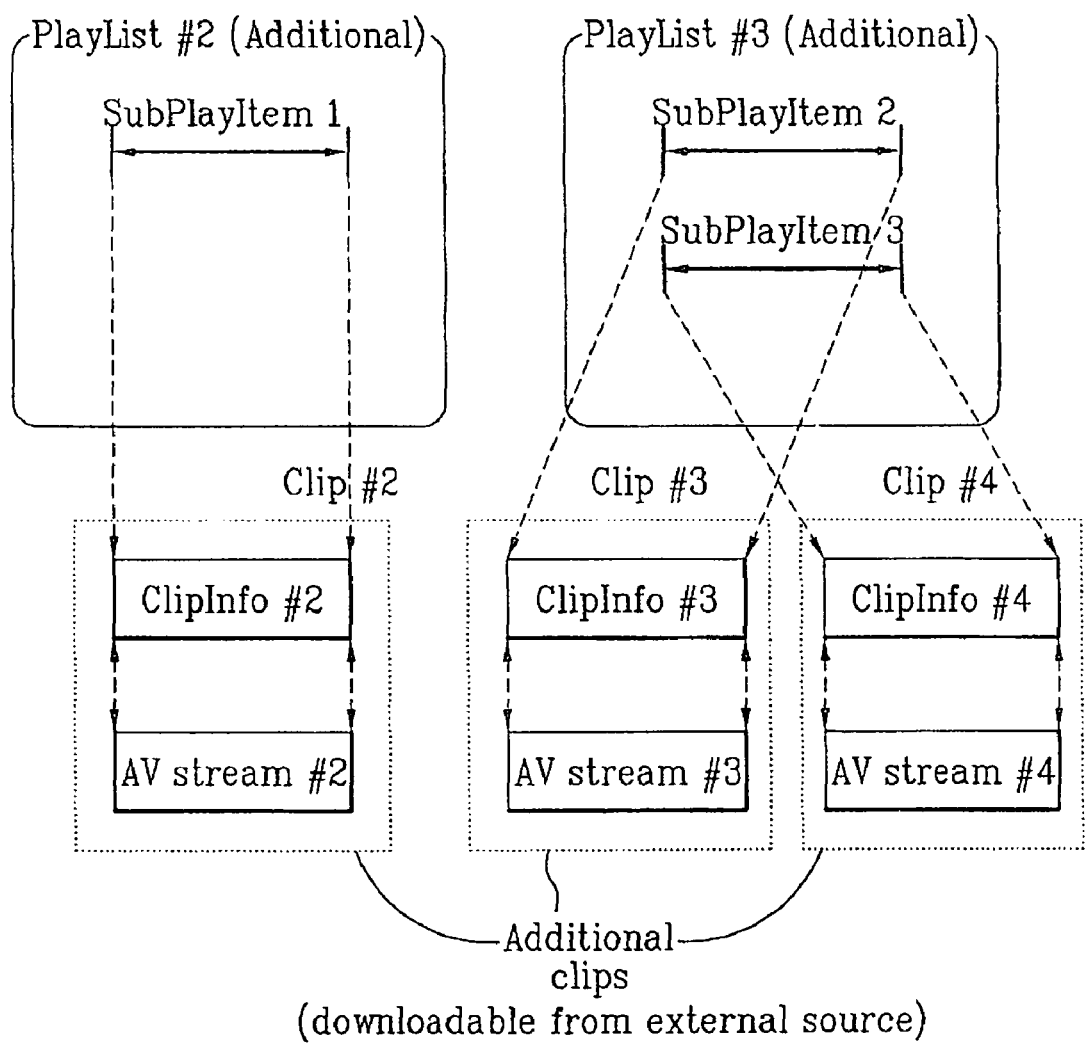
Figure 4C:
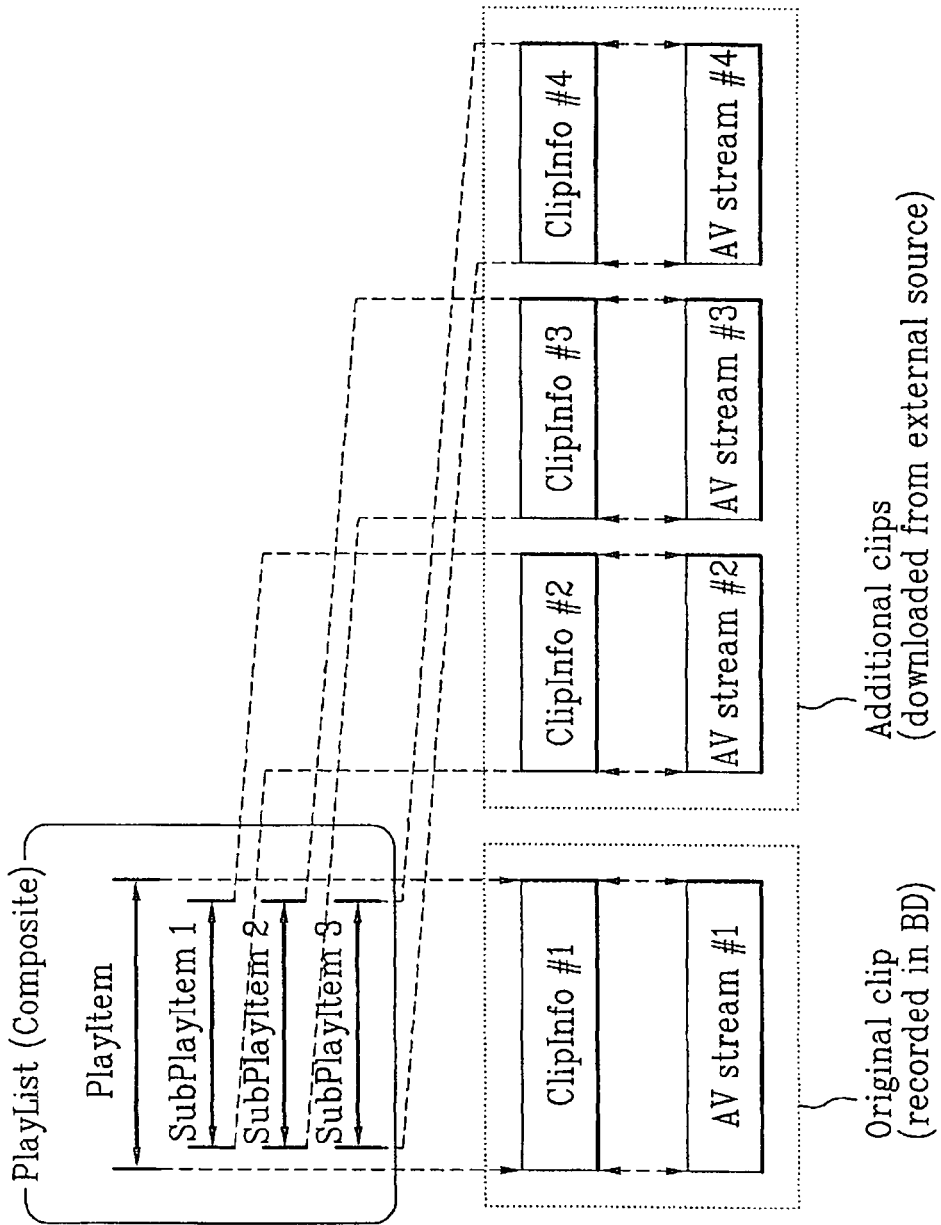

FIGS. 4A to 4C illustrate a method for playing-back a Composite PlayList, the Composite PlayList being the playback control file, according to a first embodiment of the present invention. FIG. 4A illustrates an original PlayList (PlayList #1) recorded on an optical disc. Herein, at least one PlayItem is included within the original PlayList, and the PlayItem designates a corresponding original clip (Clip #1). FIG. 4B illustrates additional PlayLists (e.g., PlayList #2, PlayList #3). One SubPlayItem (SubPlayItem #1) is included within PlayList #2, and this SubPlayItem designates a corresponding additional clip (Clip #2). And, two SubPlayItems (SubPlayItem #2, SubPlayItem #3) are included within PlayList #3, and each SubPlayItem (SubPlayItem #2, SubPlayItem #3) designates a corresponding additional clip (Clip #3, Clip #4).

More specifically, each additional PlayList functions as a playback control file for controlling the additional data downloadable from an external source. For example, the SubPlayItem (SubPlayItem #1) within the PlayList #2 may designate an audio stream, the SubPlayItem (SubPlayItem #2) within the PlayList #3 may designate a presentation graphic stream, and the SubPlayItem (SubPlayItem #3) within the PlayList #3 may designate an interactive graphic stream. Therefore, in the first embodiment of the present invention, each of the additional PlayLists (PlayList #2, PlayList #3) includes at least one SubPlayItem for reproducing the additional data. Each of the SubPlayItems included in the additional PlayLists independently designates a corresponding additional clip.

FIG. 4C illustrates an example of creating a Composite PlayList, wherein the original PlayList and the additional PlayLists are combined, according to the first embodiment of the present invention. More specifically, the original PlayList (shown in FIG. 4A) recorded within the optical disc is combined with the additional PlayLists (shown in FIG. 4B) downloaded from the external source (e.g., from the Internet) to create a new PlayList. Subsequently, the combined PlayList (or Composite PlayList) is stored in a memory (numeral 15 of FIG. 10) within the optical recording and/or reproducing apparatus 10, which then performs playback operations in accordance with a user's command. Alternatively, when the user desires to reproduce the additional data downloaded from the external source, instead of being stored in the memory (numeral 15 of FIG. 10), the Composite PlayList is temporarily created to be used for playback. Evidently, when the additional PlayList is downloaded, the corresponding additional data (i.e., Clip #2, Clip #3, Clip #4) are also downloaded and stored in the memory (numeral 15 of FIG. 10) and, then, used. The method for controlling and playing-back the Composite PlayList will be described in detail in a later process.

In other words, the Composite PlayList includes at least one PlayItem that can reproduce the original data being controlled by an original clip, and a plurality of SubPlayItems (SubPlayItem #1, SubPlayItem #2, SubPlayItem #3) that can independently reproduce the additional data being controlled by a plurality of additional clips. Furthermore, in order to create the Composite PlayList as described above, the link between the original PlayList and the additional PlayList should be defined. For example, a completely identical file name is used or a partially identical file name is used (in this case, all of the partially identical original PlayList and the additional PlayLists may be linked), or a file name of the original PlayList being linked within the additional PlayList is recorded, or a table (e.g., a "LinkPlayList_Table") for showing the link between the original PlayList and the additional PlayList is required to be defined as a separate control information.

Figure 5A:
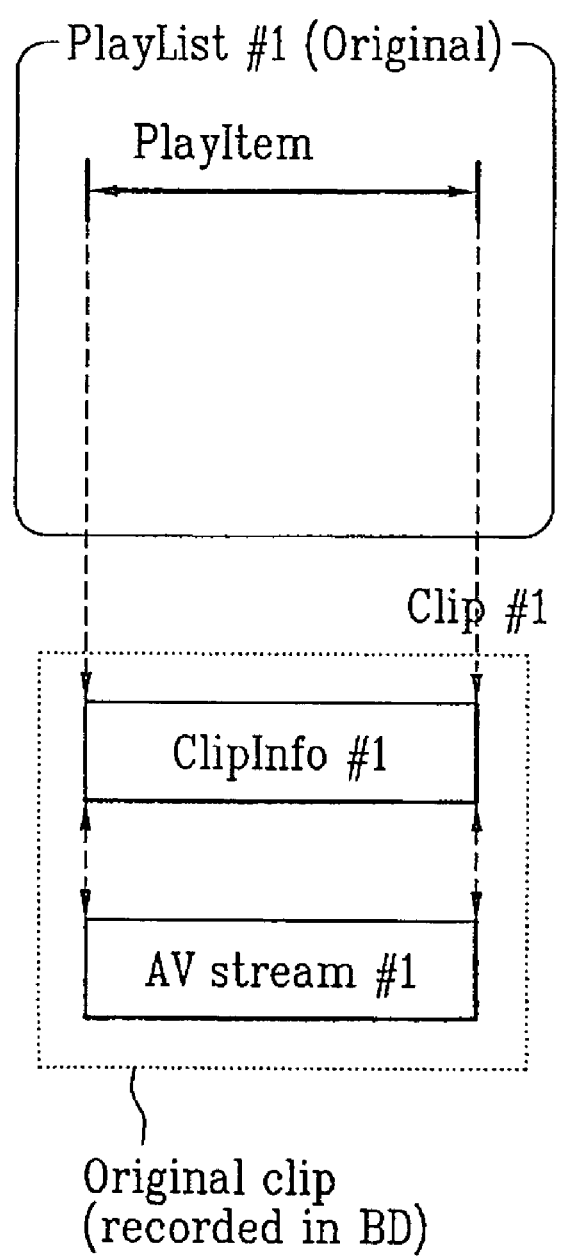
FIGS. 5A to 5C illustrate a method for playing-back a Composite PlayList according to a second embodiment of the present invention.
Figure 5B:
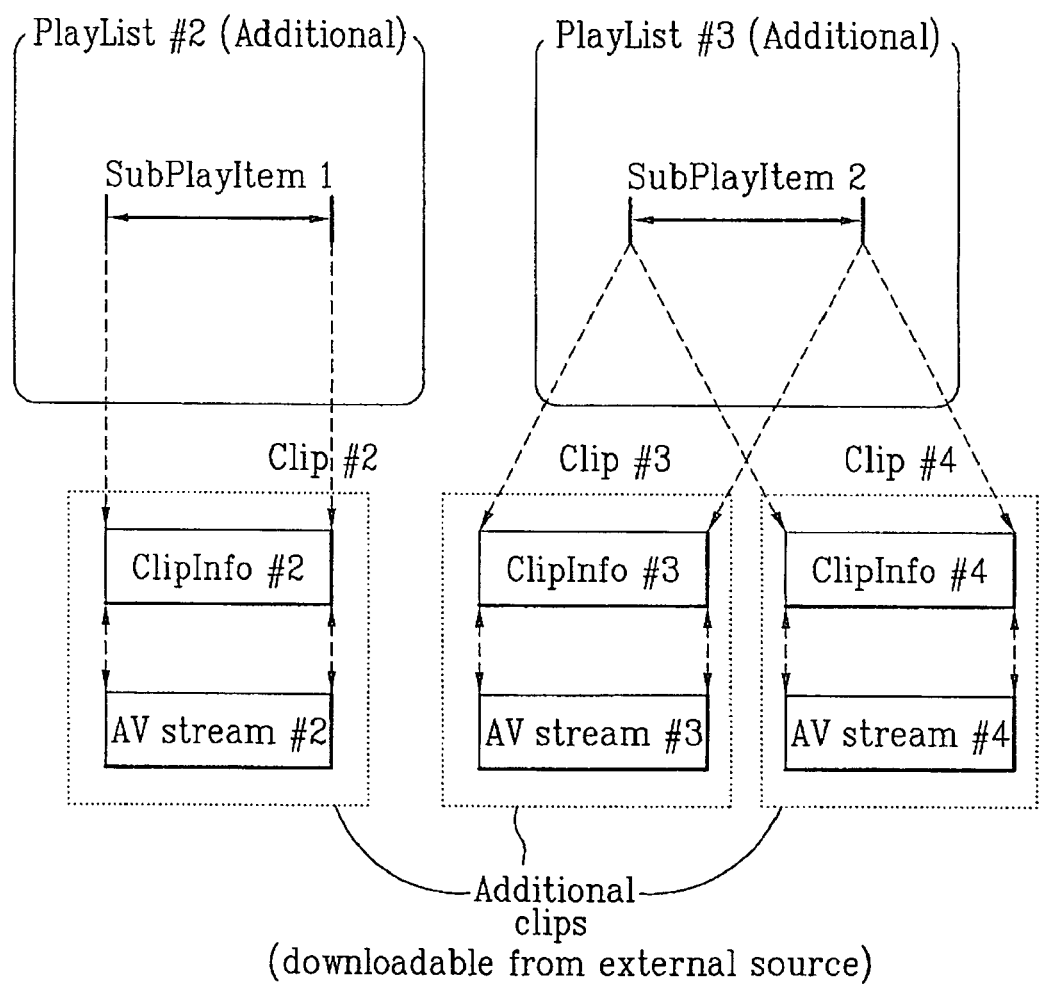
Figure 5C:
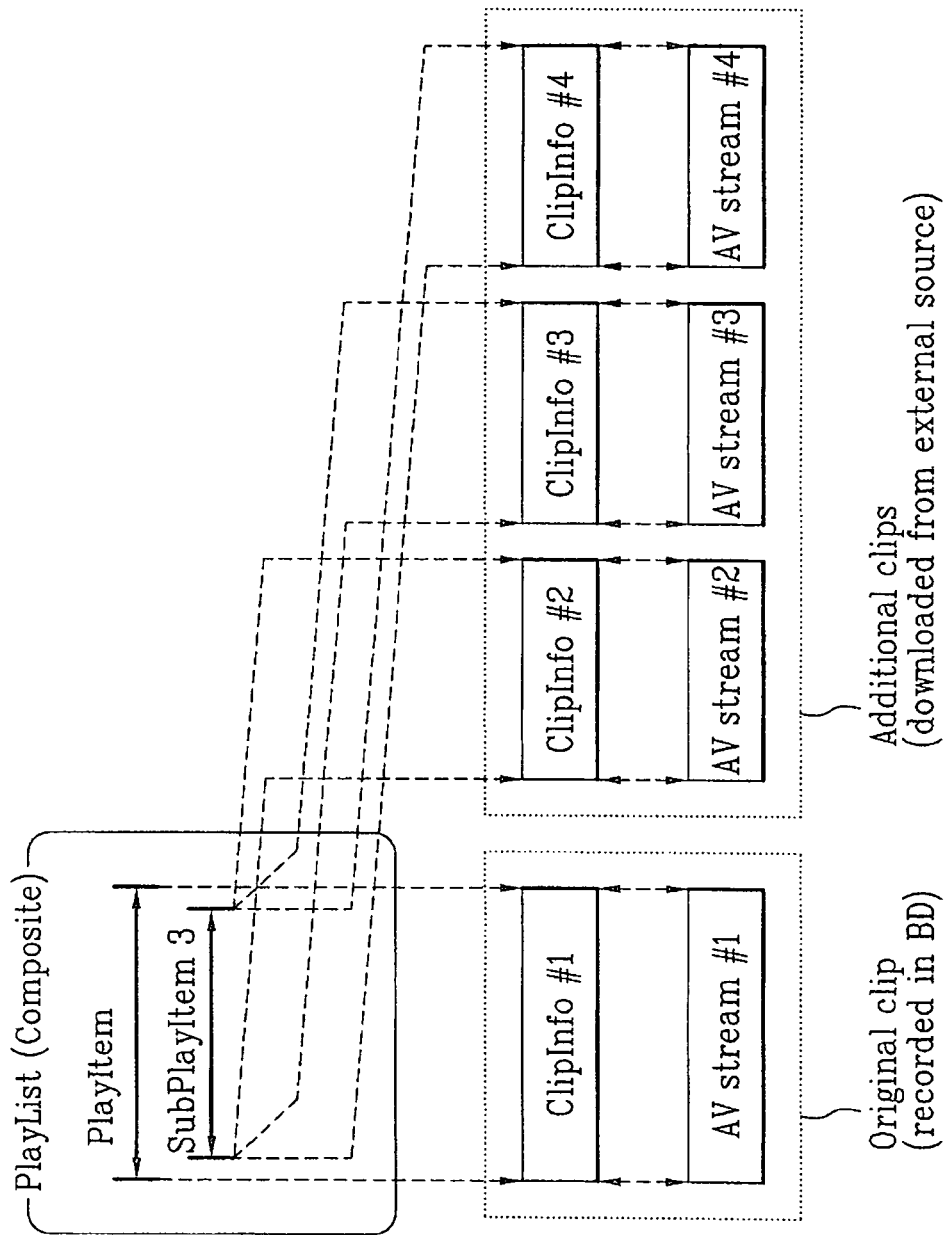

FIGS. 5A to 5C illustrate a method for playing-back a Composite PlayList, the Composite PlayList being the playback control file, according to a second embodiment of the present invention. FIG. 5A illustrates an original PlayList (PlayList #1) recorded on an optical disc. Herein, one PlayItem is included in the PlayList, and the original data of the PlayItem designates a corresponding original clip (Clip #1). FIG. 5B illustrates the additional PlayLists (PlayList #2, PlayList #3), wherein, for example, the additional PlayList consists of two PlayLists (PlayList #2, PlayList #3). Only one SubPlayItem (SubPlayItem #1, SubPlayItem #2) is included in each of PlayList #2 and PlayList #3, respectively, and the SubPlayItem designates each corresponding additional clip (Clip #2, Clip #3, Clip #4). Most particularly, when there are two additional clips being designated by additional PlayList #3, all of the additional clips (Clip #3, Clip #4) are designated by a single SubPlayItem (SubPlayItem #2).

More specifically, each of the additional PlayLists functions as a file for controlling the additional data, for example, the SubPlayItem (SubPlayItem #1) within the PlayList #2 designates the audio stream, and the SubPlayItem (SubPlayItem #2) within the PlayList #3 designates both additional clip #3 for the presentation graphic data and additional clip #4 for the interactive graphic data. In other words, in the second embodiment of the present invention, the additional PlayLists (PlayList #2, PlayList #3) for reproducing the additional data are controlled by the SubPlayItem. However, only one combined SubPlayItem is included in each of the SubPlayItems.

FIG. 5C illustrates an example of creating a Composite PlayList, wherein the original PlayList is combined with the additional PlayList, according to the second embodiment of the present invention. More specifically, when creating the Composite PlayList, the SubPlayItems (SubPlayItem #1, SubPlayItem #2) included in the additional PlayList are combined, so as to form a single SubPlayItem (SubPlayItem #3). Therefore, the Composite PlayList includes at least one PlayItem that can reproduce the original data being controlled by an original clip, and one SubPlayItem (SubPlayItem #3) that can independently reproduce the additional data being controlled by a plurality of additional clips.

A modified usage can also be applied to the second embodiment of the present invention. In other words, it is not necessarily required to create only one SubPlayItem in either the additional PlayList or the original PlayList. Instead, the present invention may also include a SubPlayItem being combined depending upon the clip property or being composed based on the component. For example, the present invention may include a SubPlayItem designating an audio stream and a SubPlayItem designating graphic data.

Figure 6A:
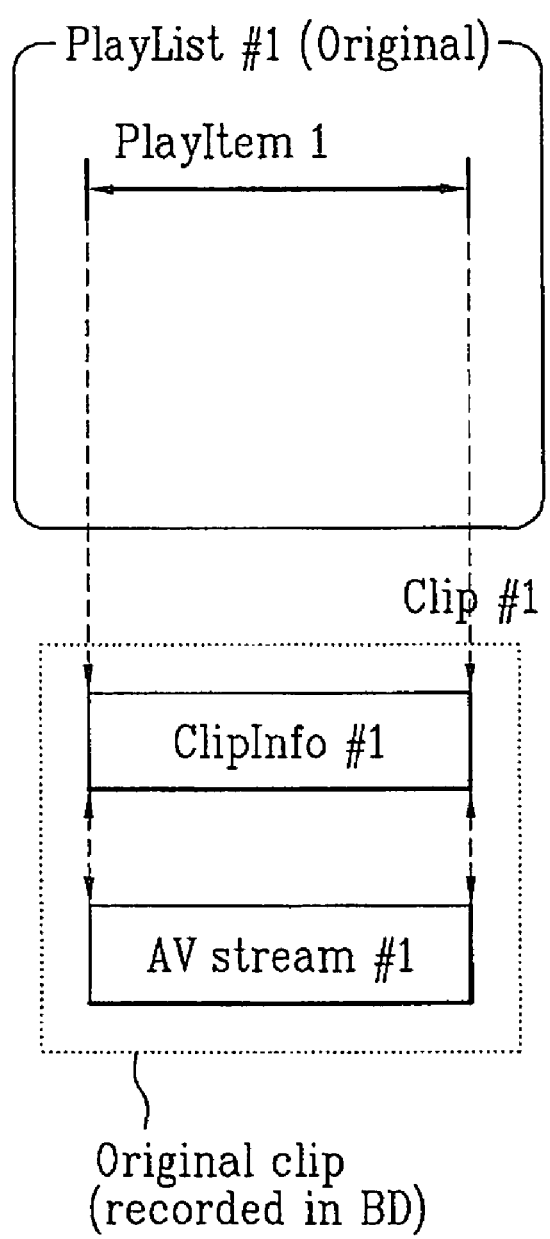
FIGS. 6A to 6C illustrate a method for playing-back a Composite PlayList according to a third embodiment of the present invention.
Figure 6B:
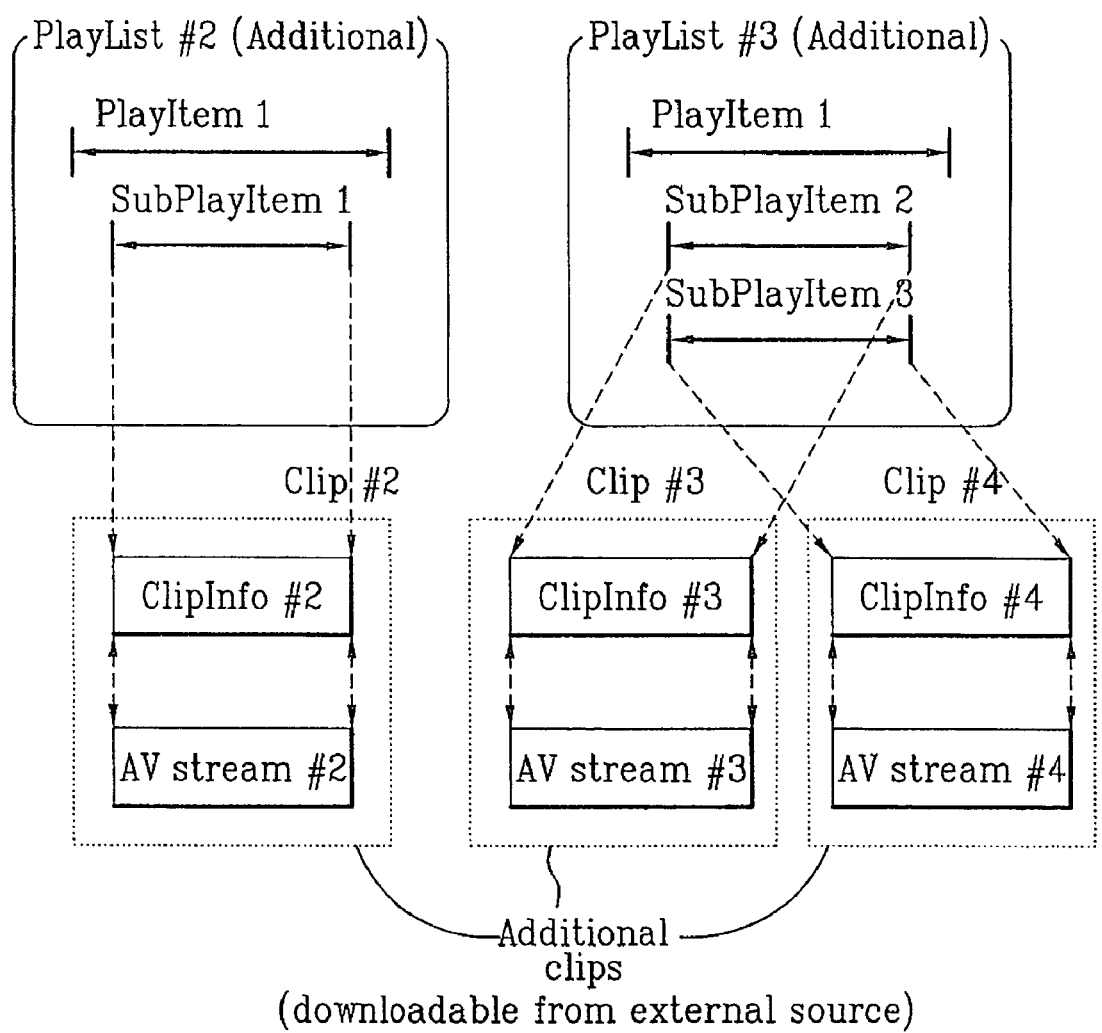
Figure 6C:
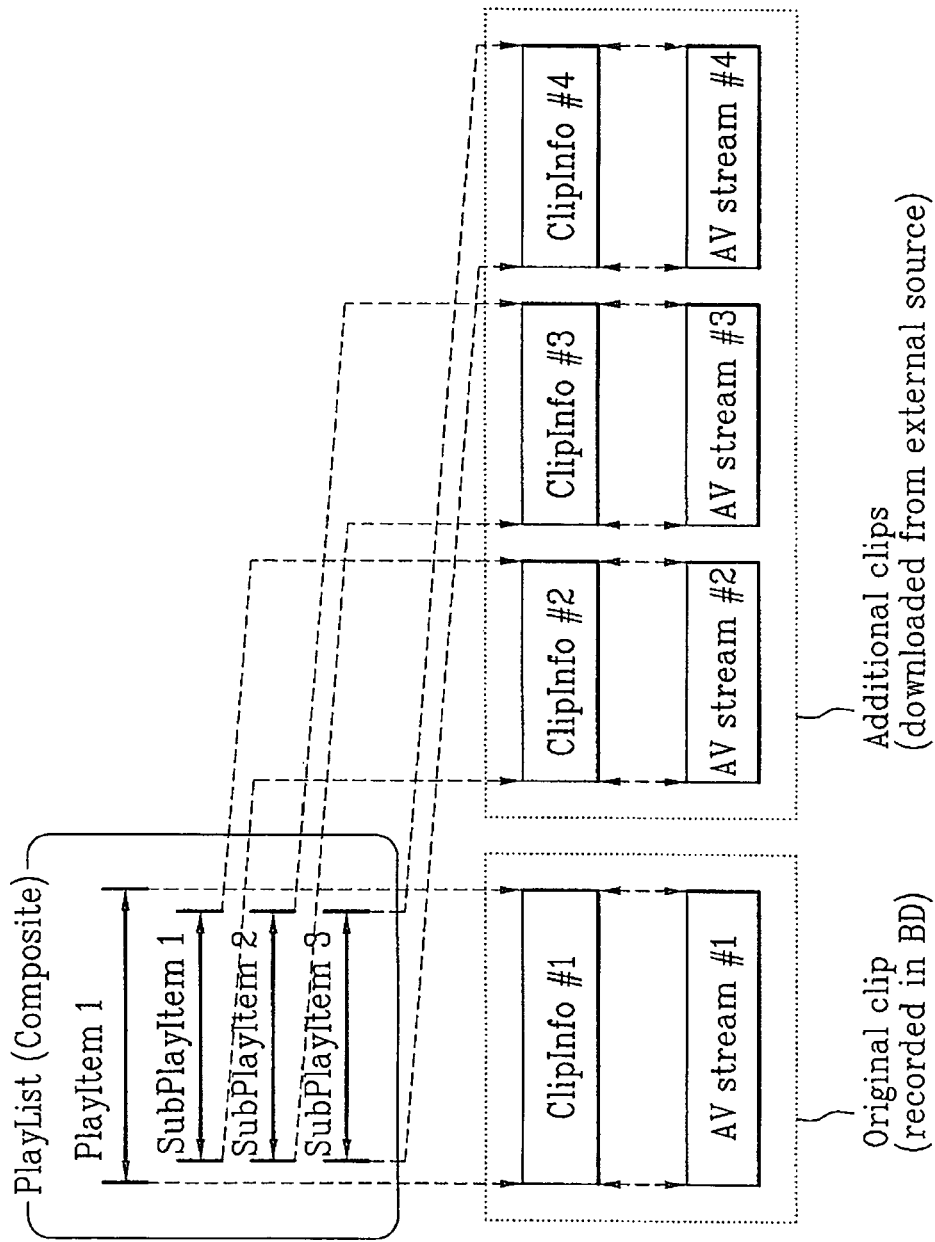

FIGS. 6A to 6C illustrate a method for playing-back a Composite PlayList, the Composite PlayList being the playback control file, according to a third embodiment of the present invention. FIG. 6A illustrates the original PlayList (PlayList #1) recorded on the optical disc. Herein, at least one PlayItem (PlayItem #1) is included in the PlayList, and the PlayItem (PlayItem #1) designates a corresponding original clip (Clip #1). FIG. 6B illustrates the additional PlayLists (PlayList #2, PlayList #3). A PlayItem (PlayItem #1) having the same information as the PlayItem (PlayItem #1) included in the original PlayList is included in the additional PlayLists (PlayList #2, PlayList #3), and each of the SubPlayItems (SubPlayItem #1, SubPlayItem #2, SubPlayItem #3) independently designates a corresponding additional clip (Clip #2, Clip #3, Clip #4).

More specifically, the third embodiment of the present invention relates to creating additional PlayLists (PlayList #2, PlayList #3) for reproducing the additional data. Herein, apart from having each SubPlayItem independently designating corresponding additional clips, as described in the first embodiment of the present invention (shown in FIG. 4B), the additional PlayList of the third embodiment of the present invention is also provided with a PlayItem (PlayItem #1) having the same information (i.e., designating the same original clip) as the PlayItem (PlayItem #1) included in the original PlayList. Accordingly, the third embodiment of the present invention has additional advantages allowing, in some particular cases, the original data to also be independently reproduced by only using the additional PlayLists (PlayList #2, PlayList #3) and without having to create a Composite PlayList.

FIG. 6C illustrates an example of creating a Composite PlayList, wherein the original PlayList is combined with the additional PlayList, according to the third embodiment of the present invention. Herein, the Composite PlayList includes a PlayItem (PlayItem #1) that can reproduce the original data being controlled by an original clip, and a plurality of SubPlayItems (SubPlayItem #1, SubPlayItem #2, SubPlayItem #3) that can independently reproduce the additional data being controlled by an additional clip.

Accordingly, in the third embodiment of the present invention, the additional PlayList and the Composite PlayList may have the same structure. For example, when one additional PlayLists (PlayList #2 or PlayList #3) is combined with the original PlayList #1, the structure of the Composite PlayList becomes identical to any one of the additional PlayLists (PlayList #2 or PlayList #3). This instance is advantageous in that, without having to create an independent Composite PlayList, the additional PlayList is sufficient for reproducing all of the original data and the additional data.

Figure 7A:
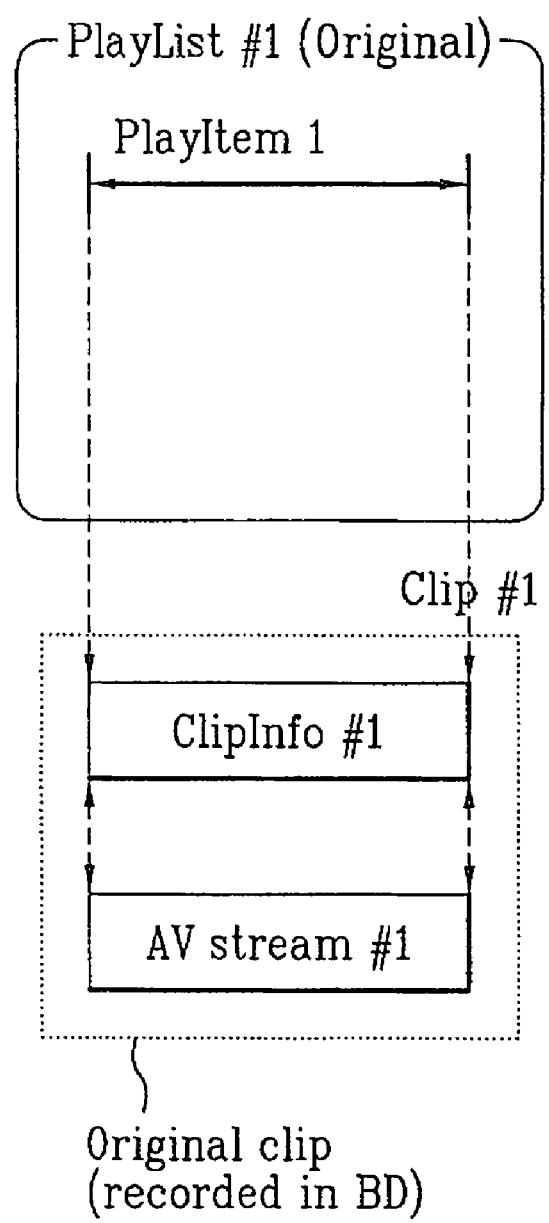
FIGS. 7A to 7C illustrate a method for playing-back a Composite PlayList according to a fourth embodiment of the present invention.
Figure 7B:
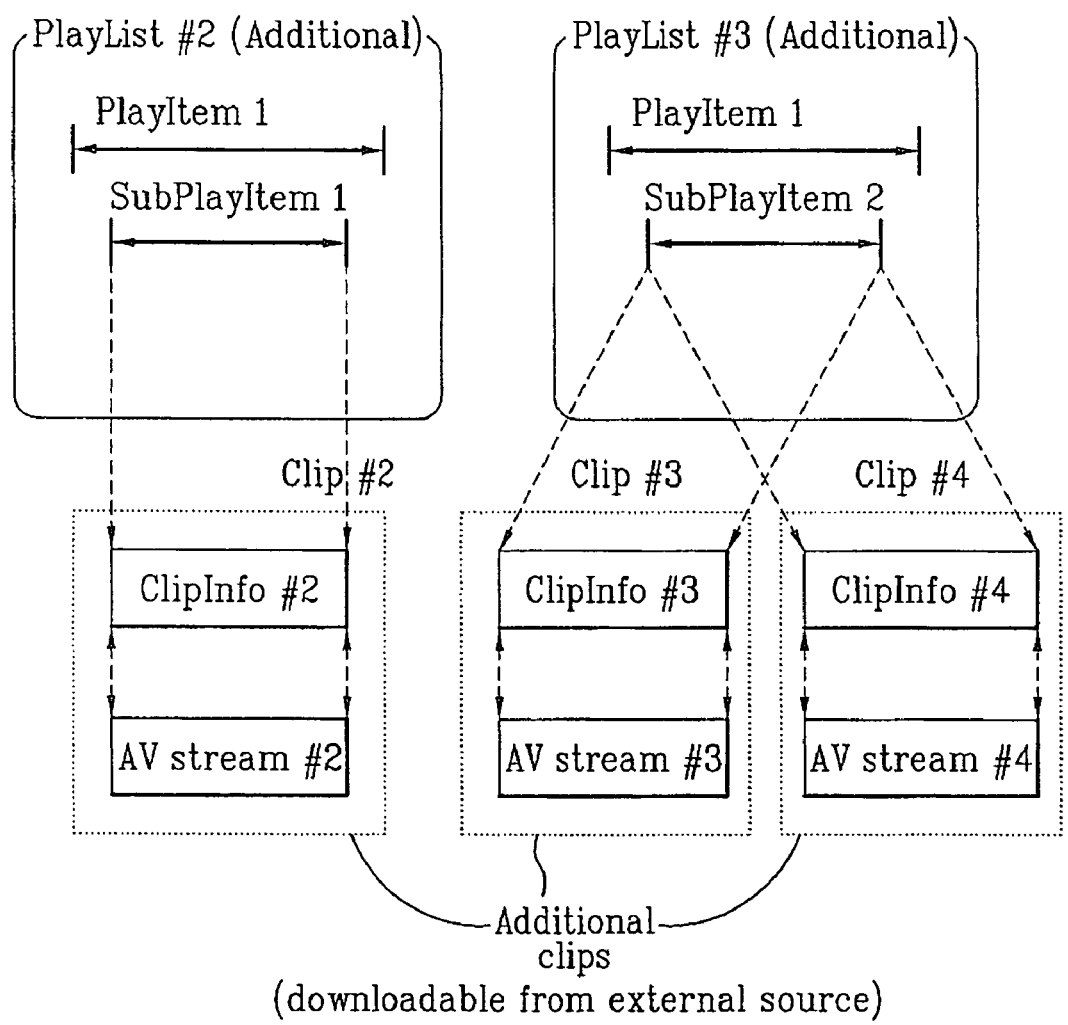
Figure 7C:
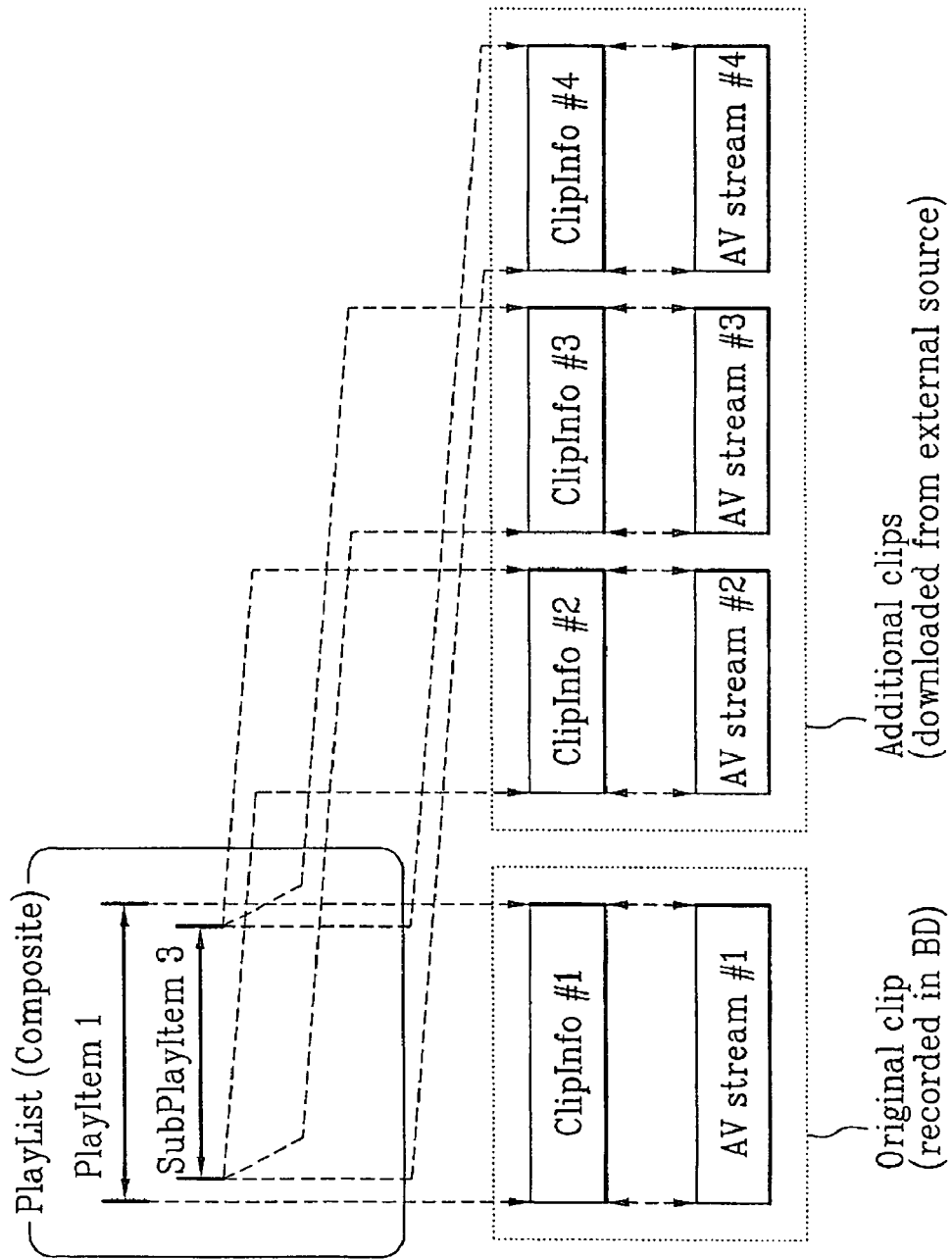

FIGS. 7A to 7C illustrate a method for playing-back a Composite PlayList, the Composite PlayList being the playback control file, according to a fourth embodiment of the present invention. FIG. 7A illustrates the original PlayList (PlayList #1) recorded on the optical disc. Herein, at least one PlayItem (PlayItem #1) is included in the PlayList, and the PlayItem (PlayItem #1) designates a corresponding original clip (Clip #1). FIG. 7B illustrates the additional PlayLists (PlayList #2, PlayList #3). A PlayItem (PlayItem #1) having the same information as the PlayItem (PlayItem #1) included in the original PlayList is included in the additional PlayLists (PlayList #2, PlayList #3). In addition, one SubPlayItem (SubPlayItem #1, SubPlayItem #2) is included in each of the additional PlayLists (PlayList #2, PlayList #3), respectively, and the additional data of the corresponding SubPlayItem designates a corresponding additional clip (Clip #2, Clip #3, Clip #4). Most particularly, even when two additional clips are designated by PlayList #3, all of the additional clips (Clip #3, Clip #4) are designated by one SubPlayItem (SubPlayItem #2).

More specifically, the third embodiment of the present invention relates to creating additional PlayLists (PlayList #2, PlayList #3) for reproducing the additional data. Herein, apart from having a single combined SubPlayItem designating a plurality of independent additional clips, as described in the second embodiment of the present invention (shown in FIG. 5B), the additional PlayList of the fourth embodiment of the present invention is also provided with a PlayItem (PlayItem #1) having the same information (i.e., designating the same original clip) as the PlayItem (PlayItem #1) included in the original PlayList. Accordingly, as described earlier in the third embodiment of the present invention, the fourth embodiment of the present invention has additional advantages allowing, in some particular cases, the original data to also be independently reproduced by only using the additional PlayLists (PlayList #2, PlayList #3) and without having to create a Composite PlayList.

FIG. 7C illustrates an example of creating a Composite PlayList, wherein the original PlayList is combined with the additional PlayList, according to the fourth embodiment of the present invention. Herein, the Composite PlayList includes a PlayItem (PlayItem #1) that can reproduce the original data being controlled by an original clip, and a single SubPlayItem (SubPlayItem #3) that can independently reproduce the additional data being controlled by a plurality of additional clips.

Figure 8A:
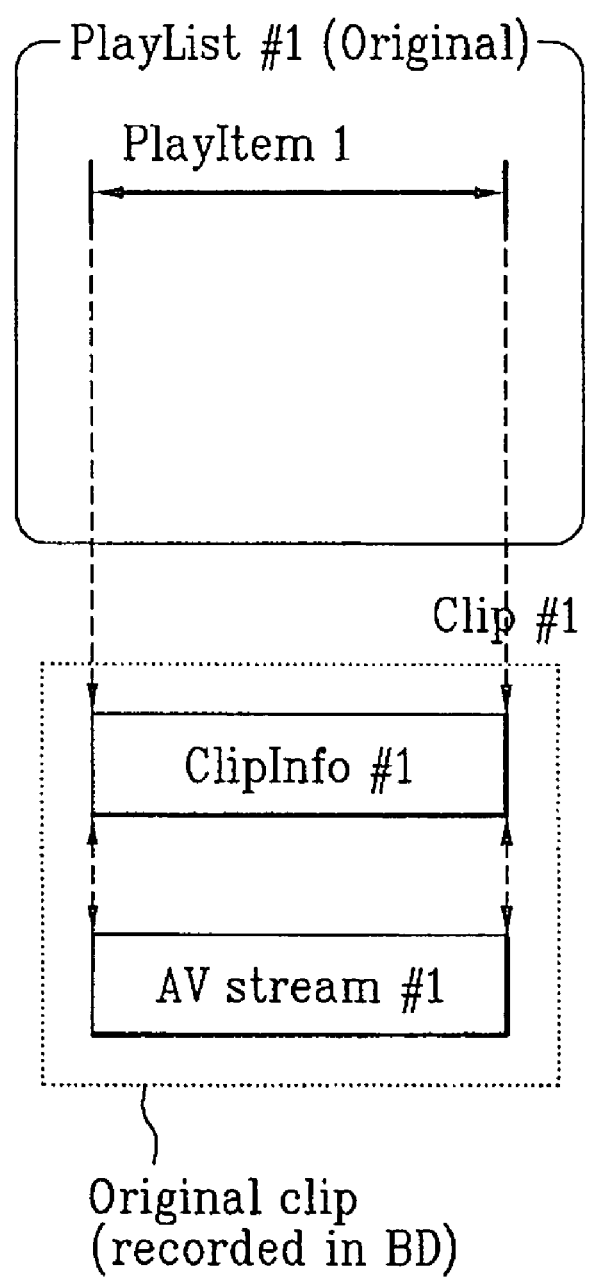
FIGS. 8A to 8C illustrate a method for playing-back a Composite PlayList according to a fifth embodiment of the present invention.
Figure 8B:
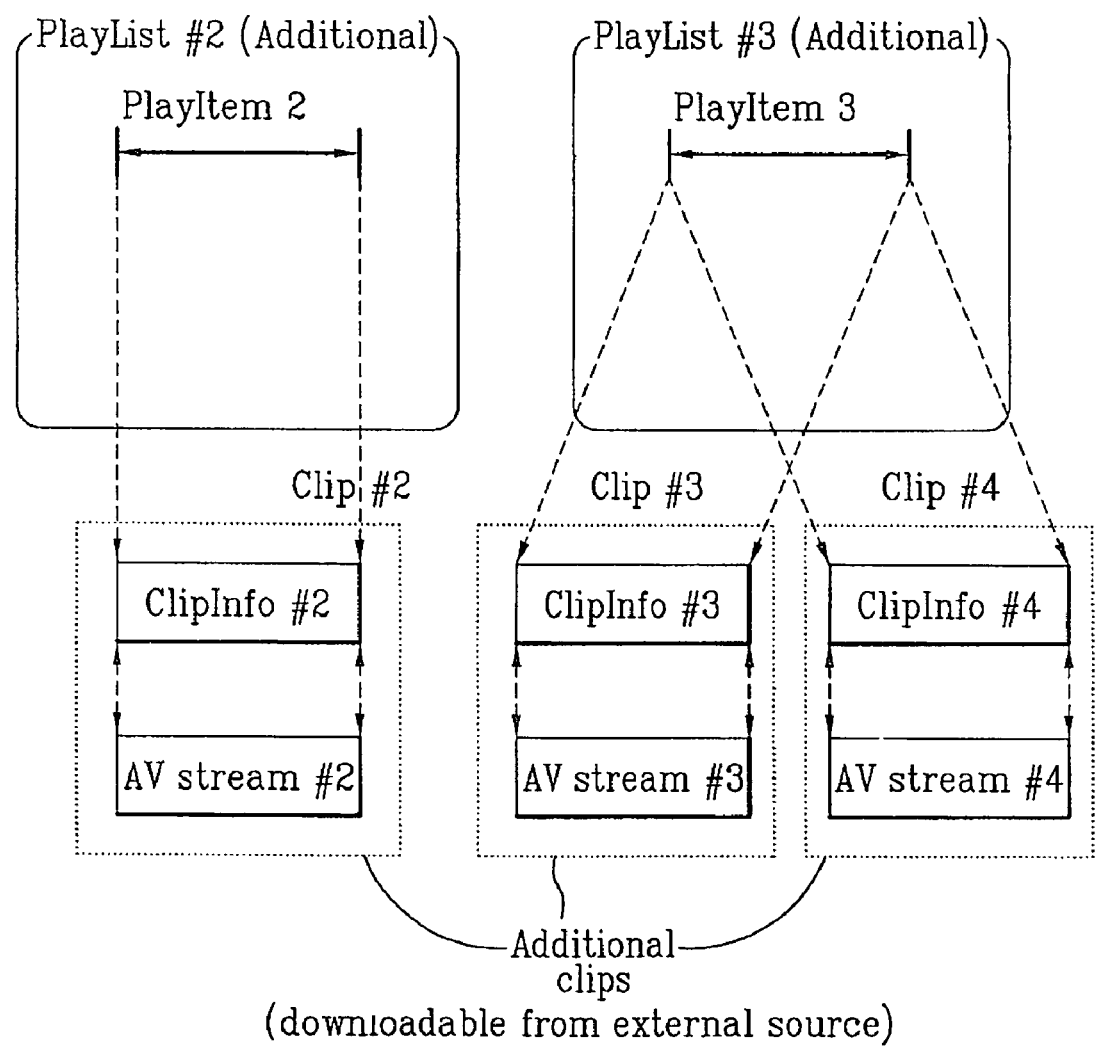
Figure 8C:
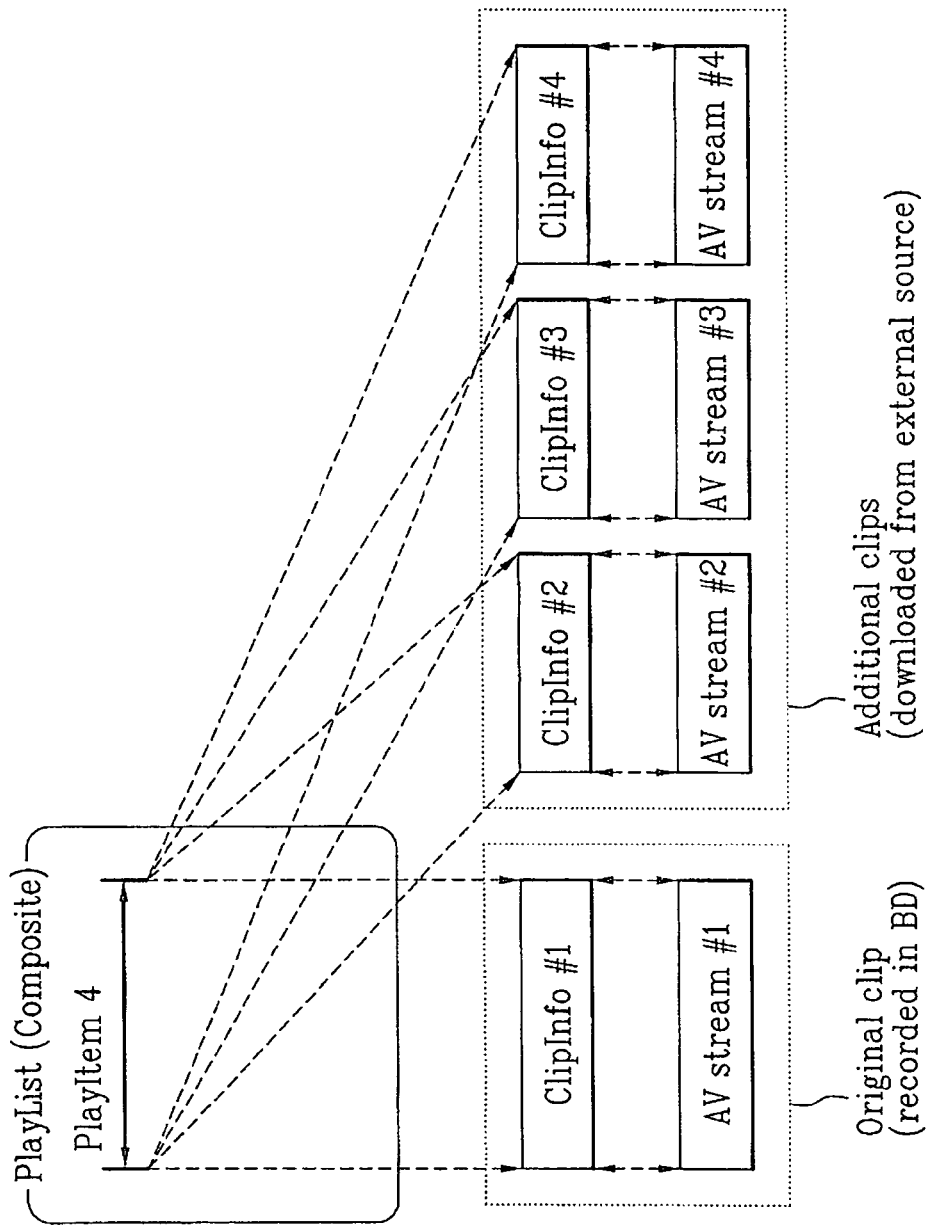

FIGS. 8A to 8C illustrate a method for playing-back a Composite PlayList, the Composite PlayList being the playback control file, according to a fifth embodiment of the present invention. FIG. 8A illustrates an original PlayList (PlayList #1) recorded on the optical disc. Herein, at least one PlayItem (PlayItem #1) is included in the PlayList, and the PlayItem (PlayItem #1) designates a corresponding original clip (Clip #1). FIG. 8B illustrates additional PlayLists (PlayList #2 and PlayList #3). A PlayItem (PlayItem #2, PlayItem #3) is included in each of the additional PlayLists (PlayList #2, PlayList #3). Each additional PlayList may designate one or more clips. For example, PlayItem #2 designate Clip #2 and PlayItem #3 designates Clip #3 and Clip #4.

More specifically, the additional PlayList functions as a basic file for controlling the additional data, for example, the PlayItem (PlayItem #2) within the PlayList #2 designates the audio stream, and the PlayItem (PlayItem #3) within the PlayList #3 designates both additional clip #3 for the presentation graphic data and additional clip #4 for the interactive graphic data. In other words, in the fifth embodiment of the present invention, the additional PlayLists (PlayList #2, PlayList #3) for reproducing the additional data are controlled by the PlayItem. However, only one combined PlayItem is included in each of the PlayLists (PlayList #2, PlayList #3).

FIG. 8C illustrates an example of creating a Composite PlayList, wherein the original PlayList is combined with the additional PlayList, according to the fifth embodiment of the present invention. More specifically, even when creating the Composite PlayList, the PlayItems (PlayItem #1, PlayItem #2, PlayItem #3) included in the original PlayList and the additional PlayList are all combined, so as to create a single PlayItem (PlayItem #4). Therefore, the Composite PlayList includes the original data that is controlled by an original clip, and one PlayItem (PlayItem #4) that can independently reproduce the additional data being controlled by a plurality of additional clips.

In addition, each additional PlayList shown in FIG. 8B may further include one or more additional SubPlayItems (not illustrated), where each additional SubPlayItem designates one or more additional clips. In this case, the composite PlayList shown in FIG. 8C may further include all the additional SubPlayItems or a single composite SubPlayItem generated by combining the additional SubPlayItems.

In the first to fifth embodiments of the present invention, depending upon the structure of the additional PlayList, which allows the additional data to be reproduced, the structure of the final Composite PlayList is determined. Accordingly, the structure of the additional PlayList for each proposed embodiment of the present invention is shown in the table below.

TABLE

| | Usage of Additional SubPlayItem | | Usage of Additional PlayItem | |
|---|---|---|---|---|
| | Independent | Combined | (for original clip) | (for additional clip) |
| First embodiment | O | | | |
| Second embodiment | | O | | |
| Third embodiment | O | | O | |
| Fourth embodiment | | O | O | |
| Fifth embodiment | | | | O |

More specifically, the first embodiment of the present invention (shown in FIGS. 4A to 4C) uses an independent SubPlayItem, and the second embodiment (shown in FIGS. 5A to 5C) uses a combined SubPlayItem. The third embodiment of the present invention (shown in FIGS. 6A to 6C) uses an independent SubPlayItem and a PlayItem designating an original clip, and the fourth embodiment (shown in FIGS. 7A and 7C) uses a combined SubPlayItem and a PlayItem designating an original clip. Finally, the fifth embodiment of the present invention (shown in FIGS. 8A to 8C) uses only a PlayItem designating additional clips.

Accordingly, when determining the structure of the additional PlayList according to the above-described first to fifth embodiments of the present invention, the structure of a specific additional PlayList is determined depending upon the additional data type (i.e., the additional clip). More specifically, when using the additional PlayList for playback controlling a plurality of additional clips corresponding to the original data, wherein each of the additional clips has a different property such as the audio stream and the text subtitle, it is preferable to use the methods according to the first embodiment (shown in FIG. 4B) and the third embodiment (shown in FIG. 6B) of the present invention. Alternatively, when using the additional PlayList for playback controlling a plurality of additional clips corresponding to the original data, wherein the additional clips have identical properties such as in the text subtitle having an additional clip for each language, it is preferable to use the methods according to the second embodiment (shown in FIG. 5B) and the fourth embodiment (shown in FIG. 7B) of the present invention. Finally, when using the additional PlayList for playback controlling a plurality of additional clips that do not correspond to the original data, wherein the additional clips have the same level such as a multi-angle video, it is preferable to use the method according to the fifth embodiment (shown in FIG. 8B) according to the present invention.

Figures 9A, 9B:
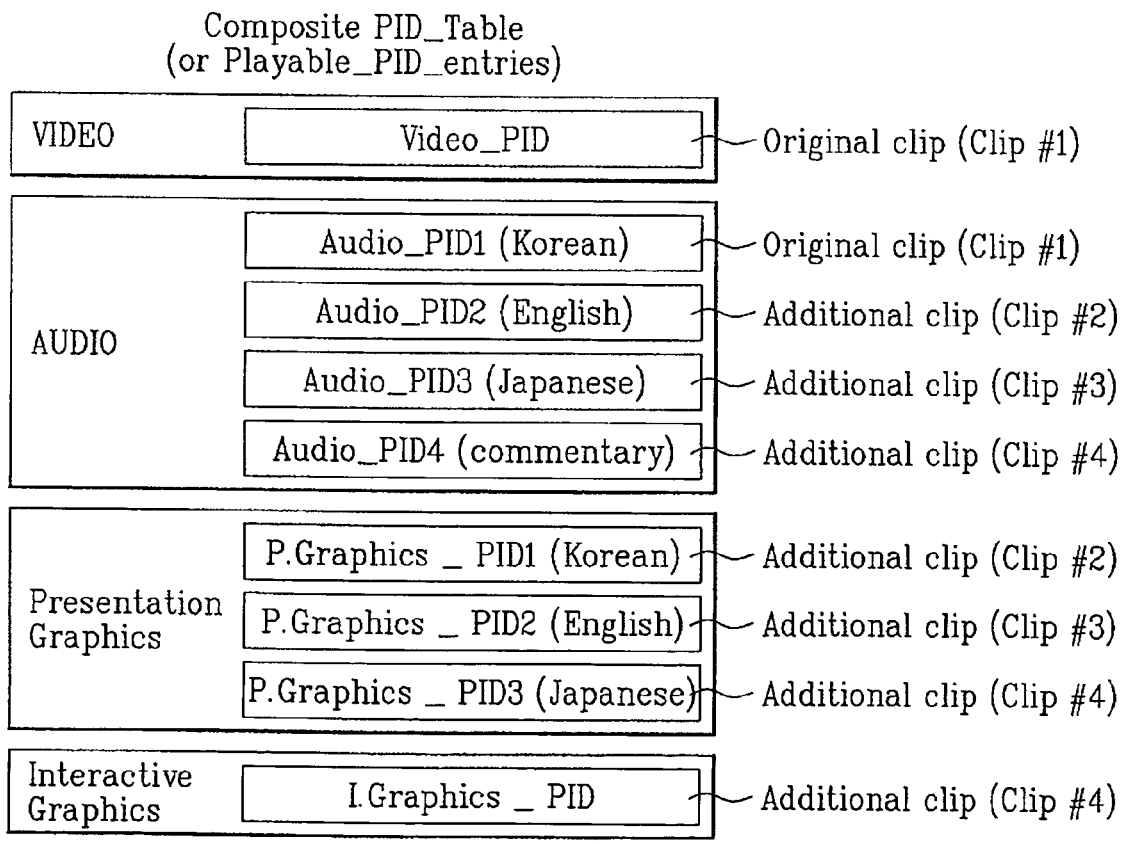
FIGS. 9A to 9C illustrate a method for controlling the Composite PlayList according to the present invention.
Figure 9C:
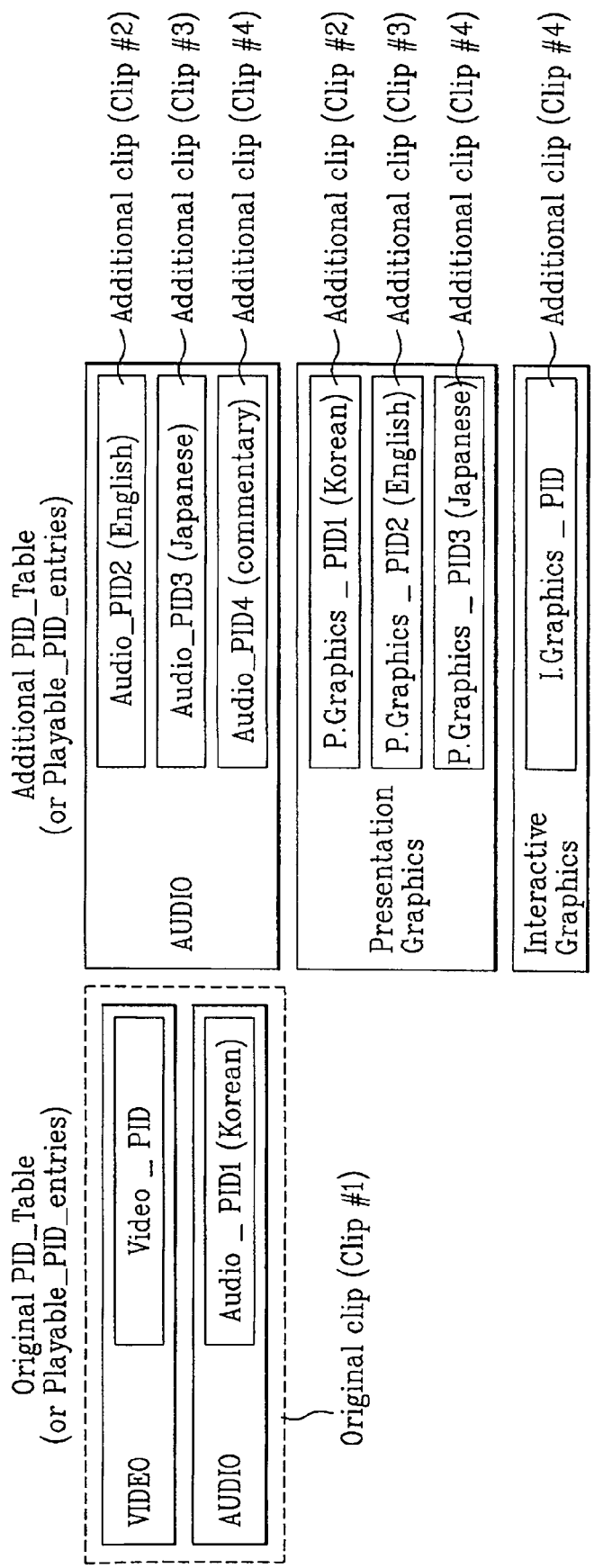

Hereinafter, with reference to FIGS. 9A to 9D, a method of using control information (shown in FIGS. 9A to 9C) and a method of using a general file for the method for controlling a Composite PlayList, the Composite PlayList being the playback control file, created according to the present invention will now be described in detail. FIGS. 9A to 9C illustrate a method for controlling the Composite PlayList according to the present invention. Herein, the control information, which allows any one of the original data and the additional data to be selected, is recorded on a specific location within a Composite PlayList file. The control information shown in FIGS. 9A to 9C is recorded in the form of a Packet ID (PID) table. Generally, PID is information being recorded on an MPEG-2 transport stream, wherein an identical ID is given to an identical packet so as to allow an AV decoder (numeral 17 of FIG. 10) to selectively decode a packet having an identical PID value. Therefore, the PID table is a type of control information for controlling the PID information in the form of a table. And, when a user desires to reproduce some specific data, the PID table may be used as reference information.

FIG. 9A illustrates an example of a syntax of the PID table, which is recorded on a specific location within the Composite PlayList. Herein, the PID table is formed of PID_entries, and each of the PID_entries includes a corresponding ref_to_stream_PID(k), and a sub_PlayItem_num, when attributes and a SubPlayItem also exist. The PID table having the above-described configuration can be recorded within a Composite PlayList, within a PlayItem or within a SubPlayItem. Also, the PID table can form a Composite PID table wherein the original data and the additional data are combined, or the PID table can separate the PID table for the original data from the PID table for the additional data, which will be described in more detail in FIGS. 9B and 9C.

FIG. 9B illustrates an example of a Composite PID_table, wherein the original data and the additional data are combined. The example shown in FIG. 9B includes one original clip (Clip #1) and three additional clips (Clip #2, Clip #3, Clip #4), which are applied in forming the Composite PlayList according to the first to fifth embodiments of the present invention. More specifically, the Composite PID_Table is a method for forming and controlling all the PID information included in the original clip (Clip #1) and the additional clips (Clip #2, Clip #3, Clip #4), which are controlled by the Composite PlayList, are formed and controlled by using a single table. Accordingly, the user is able to select a reproduction method that he or she desires (e.g., selecting a video in the original sound (or English)). And, depending upon the user selection, the optical recording and/or reproducing apparatus 10 refers to the PID_Table being recorded on a specific location within the Composite PlayList, so as to reproduce the video from the video stream of the original clip (Clip #1) and to reproduce the original sound (or English) from the audio stream (in English) of the additional clip (Clip #2), thereby meeting with the user's demands.

FIG. 9C illustrates an example of forming a PID_Table for each of the original data and the additional data, which are separated from each other. The example shown in FIG. 9B includes one original clip (Clip #1) and three additional clips (Clip #2, Clip #3, Clip #4), which are applied in creating the Composite PlayList according to the first to fifth embodiments of the present invention. More specifically, since an Original PID_Table already exists within the original PlayList, a duplicate Original PID_Table is not re-formed, and instead, only an Additional PID_Table for the additional data being controlled by the additional PlayLists are combined and formed. Furthermore, the Composite PID_Table, shown in FIG. 9B, and the Additional PID_Table, shown in FIG. 9C, can be recorded within the Composite PlayList, within the PlayItem, or within the SubPlayItem, as described above. However, it is preferable that the Composite PID_Table is recorded within the Composite PlayList, and that the Additional PID_Table is recorded within the PlayItem or the SubPlayItem provided within the Composite PlayList.

Apart from the method for controlling the Composite PlayList by using one of the Composite PID_Table and the Additional PID_Table, a method of defining attributes for each additional clip being controlled by the SubPlayItem (first to fourth embodiments) or the PlayItem (fifth embodiment) and, then, automatically reproducing the additional clip when the user selects the corresponding attribute is also proposed. For example, the original clip is automatically reproduced when there is no user-selected attribute. Then, since the attributes for each additional clip are defined within the Composite PlayList, when the user selects an audio stream (in English) included in the additional clip, additional clip #2 corresponding to the audio stream (in English) is automatically reproduced.

Figure 9D:
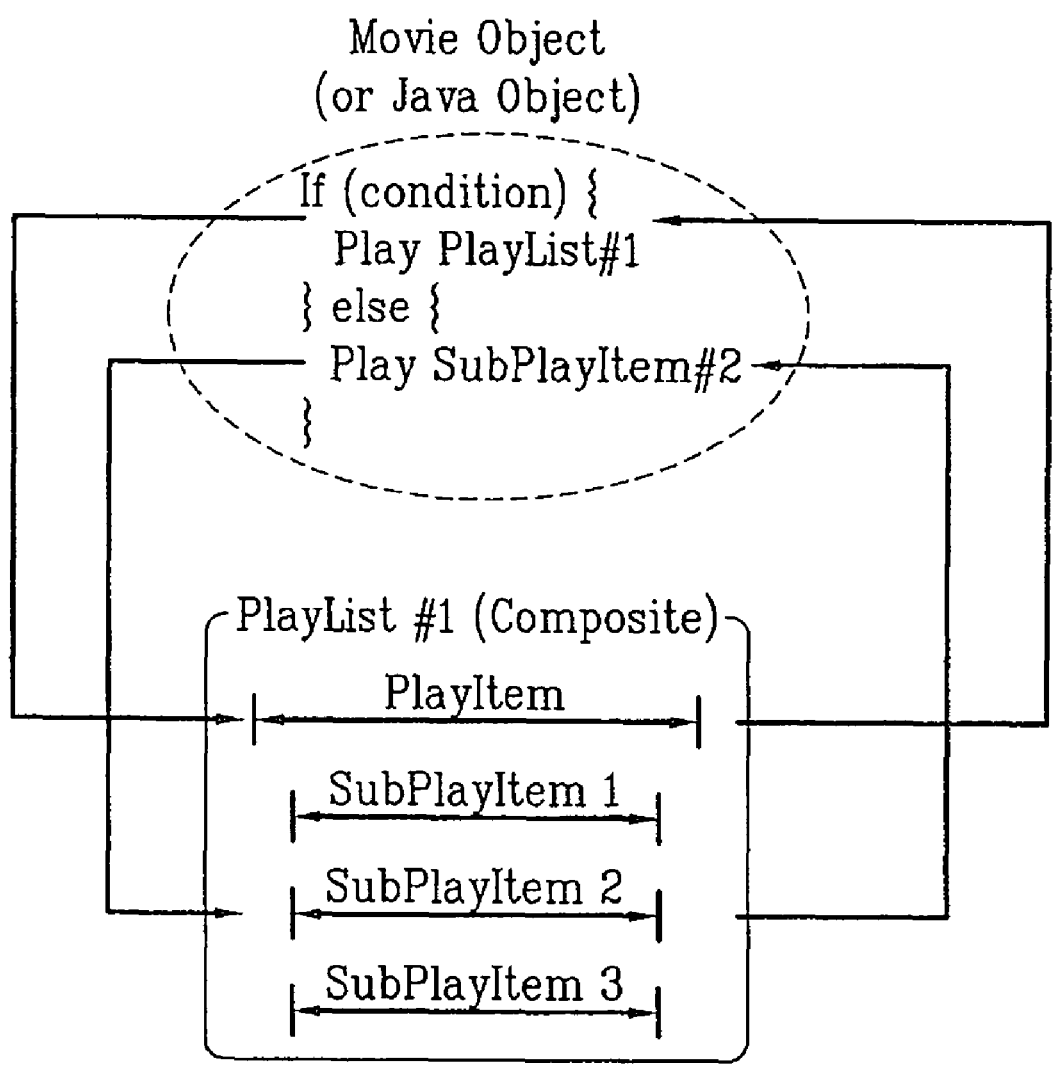
FIG. 9D illustrates another method for controlling the Composite PlayList according to the present invention.

FIG. 9D illustrates another method for controlling the Composite PlayList according to the present invention. Herein, a command enabling the original data and the additional data to be selected is controlled by using a general file, such as the MovieObject.bdmv file shown in FIG. 2. In other words, when creating the Composite PlayList, the general file is also formed, thereby pre-defining the command. The MovieObject.bmdv file (shown in FIG. 2) can be directly used as the general file, or a separate file named "JavaObject" can be created and controlled. More specifically, the above-described method is more useful when applied to the first embodiment (shown in FIG. 4C) and the third embodiment (shown in FIG. 6C), wherein a plurality of SubPlayItems exist within the Composite PlayList. For example, in a specific condition, as shown in FIG. 9D, the PlayItem reproducing the original clip within the Composite PlayList is reproduced. In another condition, by pre-defining the method for reproducing the SubPlayItem (SubPlayItem #2), which reproduces additional clip #2, the Composite PlayList can be played-back and controlled. Herein, the "specific condition" may refer to a user-selected condition, or a compulsory condition directed by the system.

Figure 10:
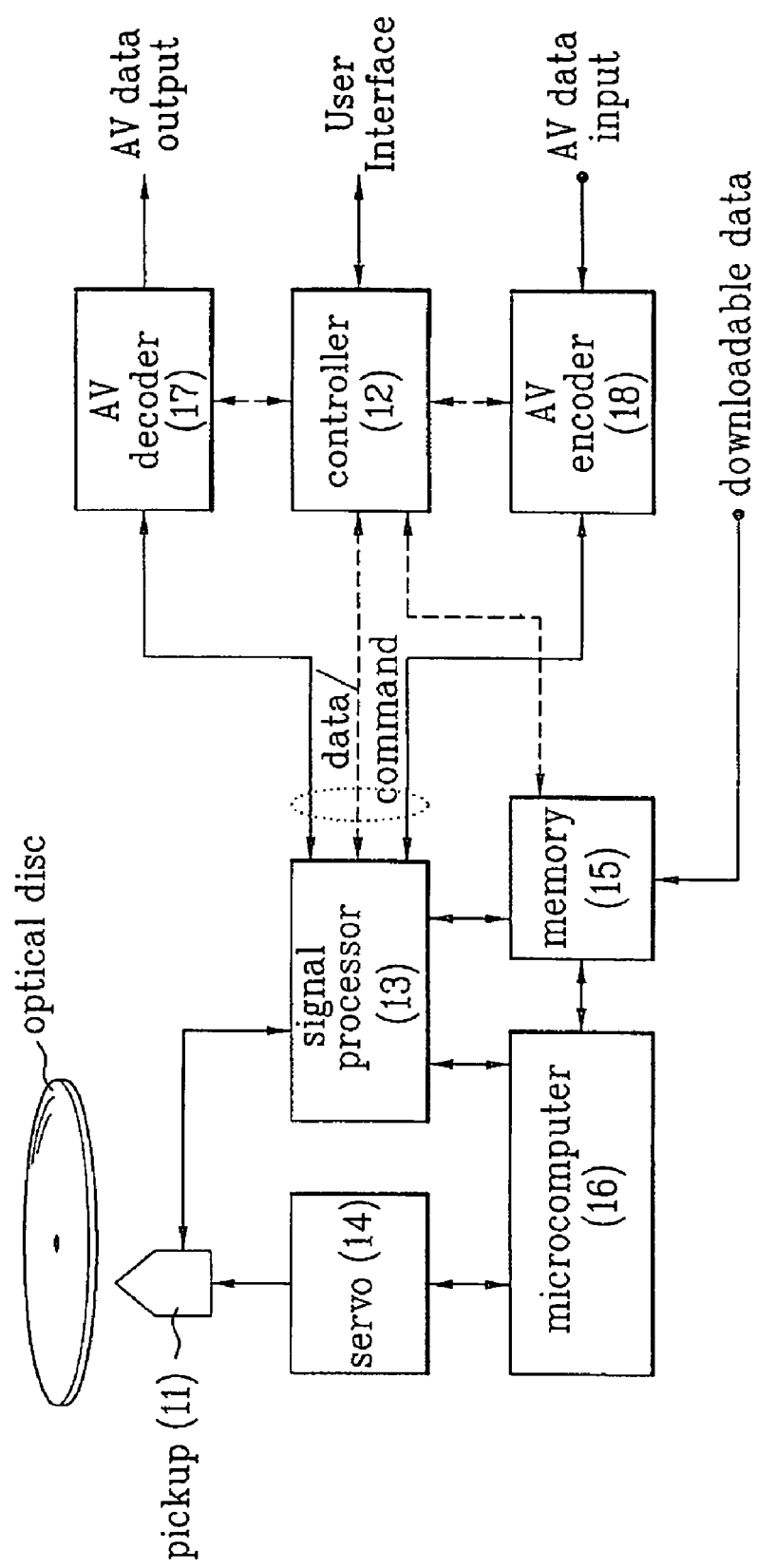
FIG. 10 illustrates an optical recording and/or reproducing apparatus according to the present invention.

FIG. 10 illustrates an optical recording and/or reproducing apparatus 10 according to the present invention, which creates and controls the Composite PlayList being the playback control file, and which records and reproduces data. The optical recording and/or reproducing apparatus 10 basically includes a pick-up unit 11 for reproducing the control information including the original data and the original PlayList recorded on the optical disc, a servo 14 controlling the operations of the pick-up unit 11, a signal processor 13 either recovering the playback signal received from the pick-up unit 11 to a desired signal value, or modulating a signal to be recorded to an optical disc recordable signal and transmitting the modulated signal, and a microcomputer 16 controlling the above operations.

Upon receiving a user command, for example, a controller 12 downloads the additional data and the additional PlayList from an external source, and stores the downloaded additional data and additional PlayList in a memory 15. Subsequently, the controller 12 combines the original PlayList reproduced from the optical disc with the additional PlayList downloaded from the external source, so as to create the Composite PlayList, and stores the newly created Composite PlayList in the memory 15. Herein, any one of the above-described first to fifth embodiments can be applied to the method of creating the Composite PlayList. Alternatively, a variation of any of the above-described embodiments may be used to form the Composite PlayList. An AV decoder 17 performs final decoding of output data (i.e., the original data and/or the additional data) depending upon the controls of the controller 12.

In the above-described structure, the memory 15 storing the Composite PlayList and the additional data may either use a separate storing means (e.g., a local storage) for further storing purposes, or use a dynamic memory for temporarily storing data. In case the memory uses the separate local storage for further storing purposes, it is preferable that the Composite PlayList put more priority in the usage of the original PlayList, which controls only the original data. Furthermore, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13.

Figure 11:
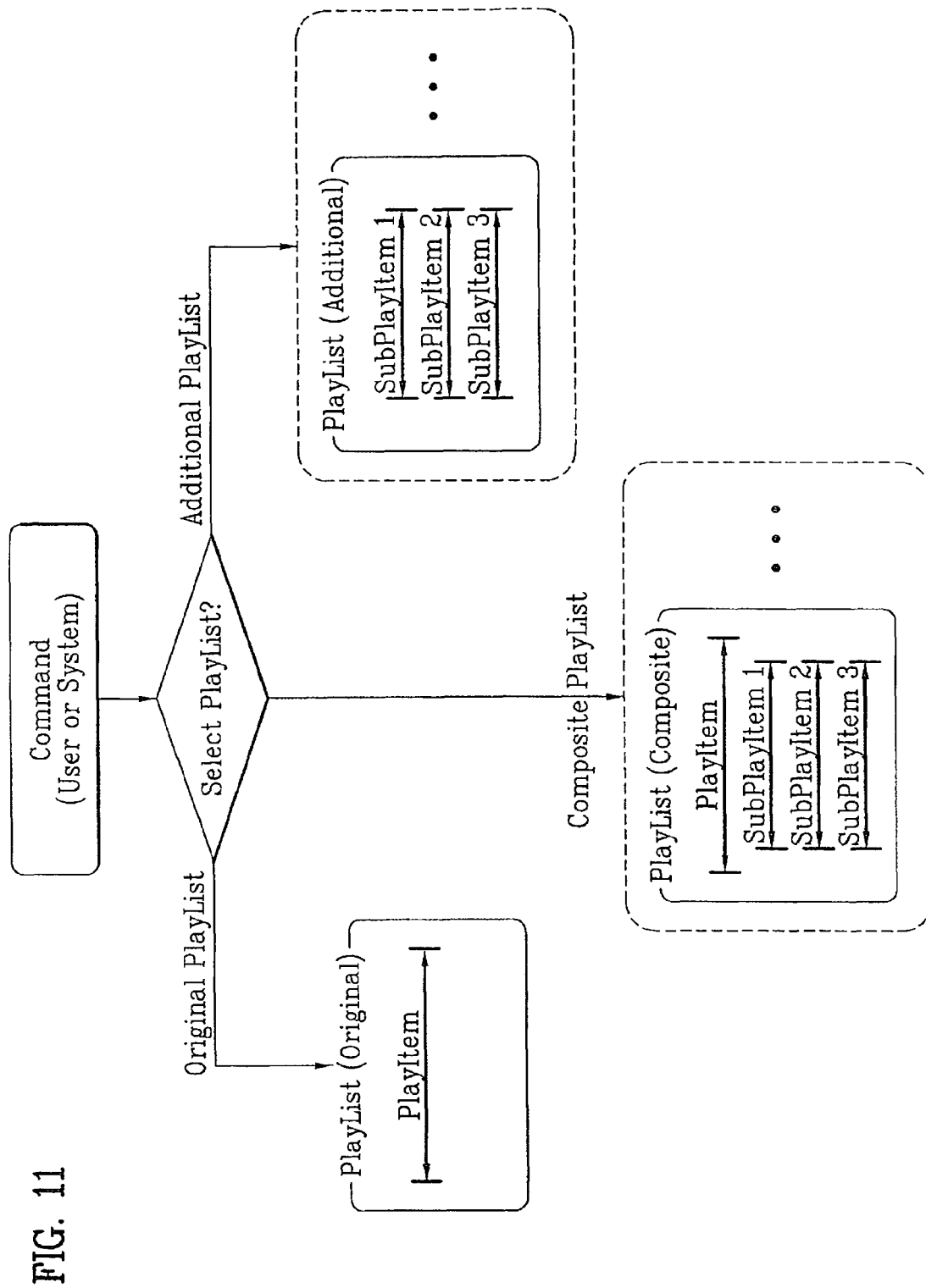
FIG. 11 illustrates a method for reproducing data recorded on the recording medium and data downloaded from an external source existing outside of the recording medium according to the present invention.

FIG. 11 illustrates a method for reproducing an optical disc according to the present invention. After creating the Composite PlayList by using the optical recording and/or reproducing apparatus 10, depending upon the user command or the system command, the PlayList that is to be reproduced is selected. More specifically, the selectable PlayList includes any one of the original PlayList being recorded within the optical disc, the additional PlayList downloadable from an external source, and a Composite PlayList being formed of a combination of the original PlayList and the additional PlayList. Then, based on the user selection or the system selection, the original data and/or the additional data being controlled by the corresponding PlayList is reproduced.

As described above, the method of creating a playback control file for a recording medium and the method and apparatus for reproducing data using the playback control file have the following advantages. The original data being recorded on the recording medium and the additional data downloaded from an external source can be more effectively used, thereby enhancing product efficiency and facilitating the user's use of the product.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reproducing original data stored on an optical disc and additional data stored in an external source, the method comprising:

downloading the additional data from the external source, the additional data including an additional clip and an additional playlist, the additional clip including an additional data stream, and the additional playlist for managing a reproduction of the additional clip;

storing the additional data in a separate local storage of a reproducing apparatus for the optical disc;

reading the original data from the optical disc, the original data including an original clip and an original playlist for managing a reproduction of the original clip, the original clip including an original data stream;

reading the additional data from the local storage;

combining the original data and the additional data based on link information to create a data structure for managing reproduction of the original clip and the additional clip, the link information indicating a link between the original playlist and the additional playlist by file name information, the data structure including a playlist for managing reproduction of the original clip and the additional clip, the playlist for managing reproduction of the original clip and the additional clip including at least one playitem designating a playing interval for the original clip and the additional clip, the playitem including a table listing packet identifications (PIDs) of the original and additional data streams in the original clip and the additional clip to permit selection of any one of the original and additional data streams during the playing interval; and reproducing the original clip and the additional clip based on the data structure.

2. The method of claim 1, wherein the playlist for managing reproduction of the original clip and the additional clip includes a first playitem which designates a playing interval of the original clip and a second playitem which designates a playing interval of the additional clip.

3. The method of claim 2, wherein the playlist for managing reproduction of the original clip and the additional clip includes a subplayitem which designates a playing interval of auxiliary data.

4. An apparatus for reproducing original data recorded on an optical disc and additional data stored in an external source, the apparatus comprising:

a pickup unit configured to read the original data from the optical disc, the original data including an original clip and an original playlist for managing a reproduction of the original clip, the original clip including an original data stream;

a local storage configured to store the downloaded additional data, the downloaded additional data including an additional clip and an additional playlist, the additional clip including an additional data stream, and the additional playlist for managing a reproduction of the additional clip; and a controller operatively coupled to the pickup unit and the local storage, the controller configured to, control the pickup unit to read the original data from the optical disc, read the downloaded additional data from the local storage, and combine the original data and the downloaded additional data based on link information to create a data structure for managing reproduction of the original clip and the additional clip, the link information indicating a link between the original playlist and the additional playlist by file name information, the data structure including a playlist for managing reproduction of the original clip and the additional clip, the playlist for managing reproduction of the original clip and the additional clip including at least one playitem designating a playing interval for the original clip and the additional clip, the playitem including a table listing packet identifications (PIDs) of the original and additional data streams in the original clip and the additional clip to permit selection of any one of the original and additional data streams during the playing interval.

5. The apparatus of claim 4, wherein the playlist for managing reproduction of the original clip and the additional clip includes a first playitem which designates a playing interval of the original clip and a second playitem which designates a playing interval of the additional clip.

6. The apparatus of claim 5, wherein the playlist for managing reproduction of the original clip and the additional clip includes a subplayitem which designates a playing interval of auxiliary data.

* * * * *

UNITED STATES PATENT AND TRADEMARK OFFICE
CERTIFICATE OF CORRECTION

| | | |
|---|---|---|
| PATENT NO. | : 7,991,773 B2 | Page 1 of 1 |
| APPLICATION NO. | : 10/989396 | |
| DATED | : August 2, 2011 | |
| INVENTOR(S) | : Seo et al. | |

It is certified that error appears in the above-identified patent and that said Letters Patent is hereby corrected as shown below:

Title page should read as

Item (54) METHOD OF CREATING PLAYBACK CONTROL FILE FOR RECORDING MEDIUM AND METHOD AND APPARATUS FOR REPRODUCING DATA USING THE PLAYBACK CONTROL FILE

Signed and Sealed this

Thirty-first Day of January, 2012

David J. Kappos
*Director of the United States Patent and Trademark Office*

UNITED STATES PATENT AND TRADEMARK OFFICE
CERTIFICATE OF CORRECTION

PATENT NO. : 7,991,773 B2  
APPLICATION NO. : 10/989396  
DATED : August 2, 2011  
INVENTOR(S) : Seo et al.

Page 1 of 1

It is certified that error appears in the above-identified patent and that said Letters Patent is hereby corrected as shown below:

Title Page, Item (54) and at Column 1, lines 1-5, Title should read as

--METHOD OF CREATING PLAYBACK CONTROL FILE FOR RECORDING MEDIUM AND METHOD AND APPARATUS FOR REPRODUCING DATA USING THE PLAYBACK CONTROL FILE--

This certificate supersedes the Certificate of Correction issued January 31, 2012.

Signed and Sealed this  
Twenty-first Day of February, 2012

David J. Kappos  
*Director of the United States Patent and Trademark Office*